(12) United States Patent
Sherwood et al.

(10) Patent No.: US 9,036,636 B1
(45) Date of Patent: May 19, 2015

(54) SYSTEM AND METHODS FOR MANAGING NETWORK PACKET BROADCASTING

(75) Inventors: Robert W. Sherwood, Palo Alto, CA (US); Robert Edward Adams, San Mateo, CA (US); Daniel E. Talayco, Sunnyvale, CA (US); Omar Baldonado, Palo Alto, CA (US); Robert K. Vaterlaus, Oakland, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 284 days.

(21) Appl. No.: 13/367,256

(22) Filed: Feb. 6, 2012

(51) Int. Cl.
*H04L 12/403* (2006.01)
*H04L 12/715* (2013.01)
*H04L 12/46* (2006.01)

(52) U.S. Cl.
CPC ............. *H04L 45/04* (2013.01); *H04L 12/4633* (2013.01)

(58) Field of Classification Search
CPC ......... H04L 45/16; H04L 45/00; H04L 45/04; H04L 12/4641; H04L 45/48; H04L 12/4645; H04L 45/42; H04L 49/354; H04L 45/02; H04L 45/54; H04L 12/18; H04L 12/1886; H04L 12/4633; H04L 49/253; H04L 49/254; H04L 41/12
USPC ......... 370/229, 230, 235, 254, 256, 351, 357, 370/384, 386, 389, 392, 422; 709/223, 226
See application file for complete search history.

(56) References Cited

U.S. PATENT DOCUMENTS

| | | | | |
|---|---|---|---|---|
| 6,147,995 | A * | 11/2000 | Dobbins et al. | 370/392 |
| 6,839,348 | B2 * | 1/2005 | Tang et al. | 370/390 |
| 7,120,834 | B1 * | 10/2006 | Bishara | 714/43 |
| 7,181,674 | B2 * | 2/2007 | Cypher et al. | 714/776 |
| 7,512,146 | B1 | 3/2009 | Sivasankaran et al. | |
| 2005/0216442 | A1 * | 9/2005 | Liskov et al. | 707/1 |
| 2008/0189769 | A1 * | 8/2008 | Casado et al. | 726/4 |
| 2008/0247395 | A1 * | 10/2008 | Hazard | 370/392 |
| 2008/0279196 | A1 * | 11/2008 | Friskney et al. | 370/395.53 |
| 2009/0067348 | A1 * | 3/2009 | Vasseur et al. | 370/256 |
| 2010/0257263 | A1 * | 10/2010 | Casado et al. | 709/223 |

(Continued)

OTHER PUBLICATIONS

Pfaff et al., OpenFlow Switch Specification, Dec. 31, 2009, 42 pages.

(Continued)

*Primary Examiner* — Gary Mui
*Assistant Examiner* — Michael Phillips
(74) *Attorney, Agent, or Firm* — Treyz Law Group; Chih-Yun Wu; Michael H. Lyons

(57) ABSTRACT

A network of switches that forwards network packets between end hosts may be controlled by a controller. The controller may maintain information that identifies subsets of the end hosts that are associated with respective broadcast domains. The controller may use network topology information to determine which of the switches are coupled in a forwarding tree formed from network paths between the end hosts of a broadcast domain. The controller may be used to configure the switches with an identifier that identifies which broadcast domain is associated with each subset of end hosts. The controller may configure switches of a given forwarding tree that are coupled to end hosts of an associated broadcast domain to modify broadcast network packets received from the end hosts with the identifier and to forward the modified broadcast network packets along the forwarding tree exclusively to end hosts of the associated broadcast domain.

16 Claims, 23 Drawing Sheets

(56) References Cited

U.S. PATENT DOCUMENTS

| | | | |
|---|---|---|---|
| 2010/0290465 A1 | 11/2010 | Ankaiah et al. | |
| 2011/0090911 A1* | 4/2011 | Hao et al. | 370/395.53 |
| 2011/0255540 A1* | 10/2011 | Mizrahi et al. | 370/392 |
| 2011/0299537 A1* | 12/2011 | Saraiya et al. | 370/392 |
| 2012/0140637 A1* | 6/2012 | Dudkowski et al. | 370/238 |
| 2012/0287936 A1* | 11/2012 | Biswas et al. | 370/395.3 |
| 2012/0324068 A1* | 12/2012 | Jayamohan et al. | 709/222 |
| 2013/0034104 A1* | 2/2013 | Yedavalli et al. | 370/400 |
| 2013/0058358 A1* | 3/2013 | Fulton et al. | 370/412 |
| 2013/0070762 A1* | 3/2013 | Adams et al. | 370/389 |

OTHER PUBLICATIONS

McKeown et al., OpenFlow: Enabling Innovation in Campus Networks, Mar. 14, 2008, 6 pages.

Cisco Systems, Cisco Catalyst 6500 Architecture, 1992-2007, 28 pages.

Casado et al., "SANE: A Protection Architecture for Enterprise Networks," Usenix Security, Aug. 2006 (15 pages).

Casado et al., "Ethane: Taking Control of the Enterprise," Conference of Special Interest Group on Data Communication (SIGCOMM), Japan, Aug. 2007 (12 pages).

Koponen et al., "Onix: A Distributed Control Platform for Large-scale Production Networks," Usenix Security, Oct. 2010 (14 pages).

Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet<URL: http://openflowswitch.org/downloads/technicalreports/openflow-tr-2009-1-flowvisor.pdf.

Cisco Systems, "Scalable Cloud Network with Cisco Nexus 1000V Series Switches and VXLAN," 2011 [Retrieved on Feb. 6, 2012]. Retrieved from the Internet: <URL:http://www.cisco.com/en/US/prod/collateral/switches/ps9441/ps9902/white_paper_c11-685115.pdf>.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D

SYSTEM AND METHODS FOR MANAGING NETWORK PACKET BROADCASTING

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

The network may include end hosts that send network packets to the switches for forwarding through the network. End hosts in the network sometimes send broadcast network packets that are flooded throughout the network (i.e., the broadcast network packets are destined for all end hosts in the network). As an example, an end host may send broadcast network packets to discover network addresses of other end hosts. Flooding of a network associated with broadcasting network packets can generate undesirable amounts of network traffic (e.g., because the network packets may be forwarded by the network switches to many end hosts). Therefore, it may be desirable to provide the network with improved network packet broadcasting capabilities.

SUMMARY

A network may include end hosts that are coupled to switches that are used to forward network packets between the end hosts. The switches may be controlled by a controller such as a centralized controller server or a distributed controller server. The controller may maintain information that identifies subsets of the end hosts that are associated with respective broadcast domains. The information may include a list of end hosts for each broadcast domain. The list of end hosts for each broadcast domain may be gathered by the controller from a user such as network administrator. The controller may use the list of end hosts for a given broadcast domain along with network topology information to determine which of the switches are coupled in a forwarding tree formed from network paths between the end hosts of the broadcast domain. For example, the controller may use greedy algorithms to compute which switches should be included in the forwarding tree. The forwarding tree may, for example, be computed as a spanning tree formed from a minimum number of network paths between the end hosts of the broadcast domain (e.g., the spanning tree may include a minimum number of switches and/or switch ports while ensuring that all end hosts of the broadcast domain are coupled via network paths of the spanning tree).

The controller may be used to configure the switches with an identifier (e.g., broadcast domain information) that identifies which broadcast domain is associated with each subset of end hosts. The controller may configure switches of a given forwarding tree that are coupled to end hosts of an associated broadcast domain to modify broadcast network packets received from the end hosts with the identifier. For example, the controller may configure the switches so that the identifier is stored in a network address field such as a destination Ethernet address field. If desired, the identifier may be stored in other header fields such as a virtual local area network field.

The network may include non-client switches that do not have controller clients and therefore are not controlled by the controller. The non-client switches may be interposed between client switches in the network that are controlled by the controller. Network tunnels may be formed between client switches that are separated by non-client switches. Network packets such as broadcast network packets that are to be forwarded from a first client switch to a second client switch through non-client switches via a network tunnel may be modified by the first client switch with network tunneling information to form encapsulated network packets. The network tunneling information may direct the non-client switches to forward the encapsulated network packets from the first client switch to the second client switch.

Switches in the network may sometimes have limited packet processing capabilities. For example, switches in the network that are configured to modify broadcast network packets by storing a broadcast domain identifier in the broadcast network packets may be unable to send the modified broadcast network packets through network tunnels and to other client switches in parallel. The controller may configure the switches that have limited packet processing capabilities to forward the modified broadcast network packets to the other client switches and to a loopback interface of the switches. The controller may configure the switches that have limited packet processing capabilities to encapsulate network packets (e.g., the modified broadcast network packets) that are received at the loopback interfaces and forward the encapsulated network packets through network tunnels.

In another embodiment, switches in a network may be configured by a controller with packet forwarding information for each end host of a broadcast domain that directs switches associated with the broadcast domain to forward broadcast network packets from that end host exclusively to the end hosts of the broadcast domain. For example, a broadcast network packet sent by an end host of a given broadcast domain may be forwarded by the switches associated with that broadcast domain (e.g., using the packet forwarding information) to the other end hosts of that broadcast domain without being sent to end hosts that are not associated with that broadcast domain.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fifth physical port in a switch in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
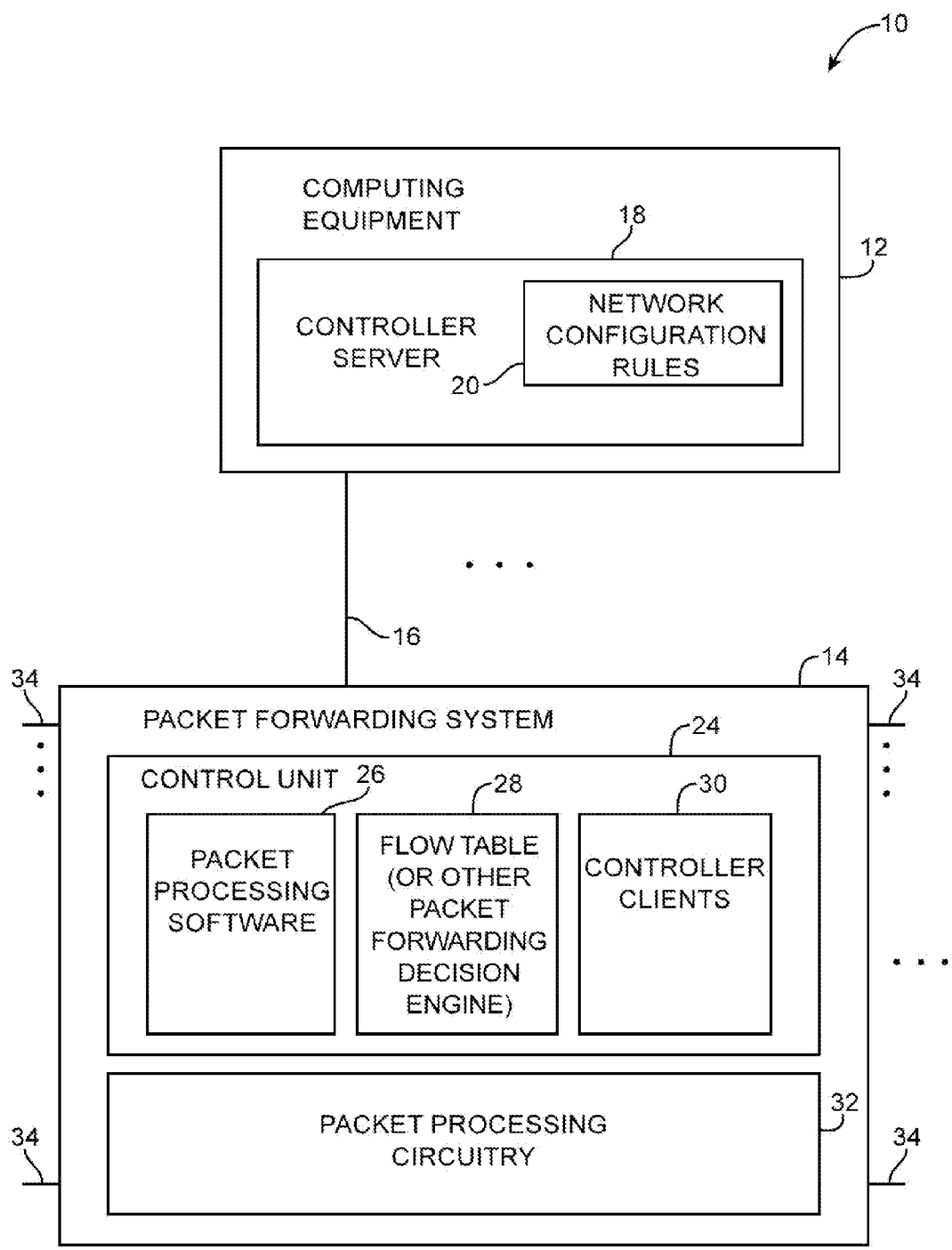
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Control server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18, may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. Any packet forwarding decision engine may be used to assist packet forwarding system 14 to make decisions about how to forward network packets. For example, packet forwarding decision engines 28 may direct packet forwarding system 14 to forward network packets to predetermined ports based on attributes of the network packets (e.g., based on network protocol headers).

Figure 2:
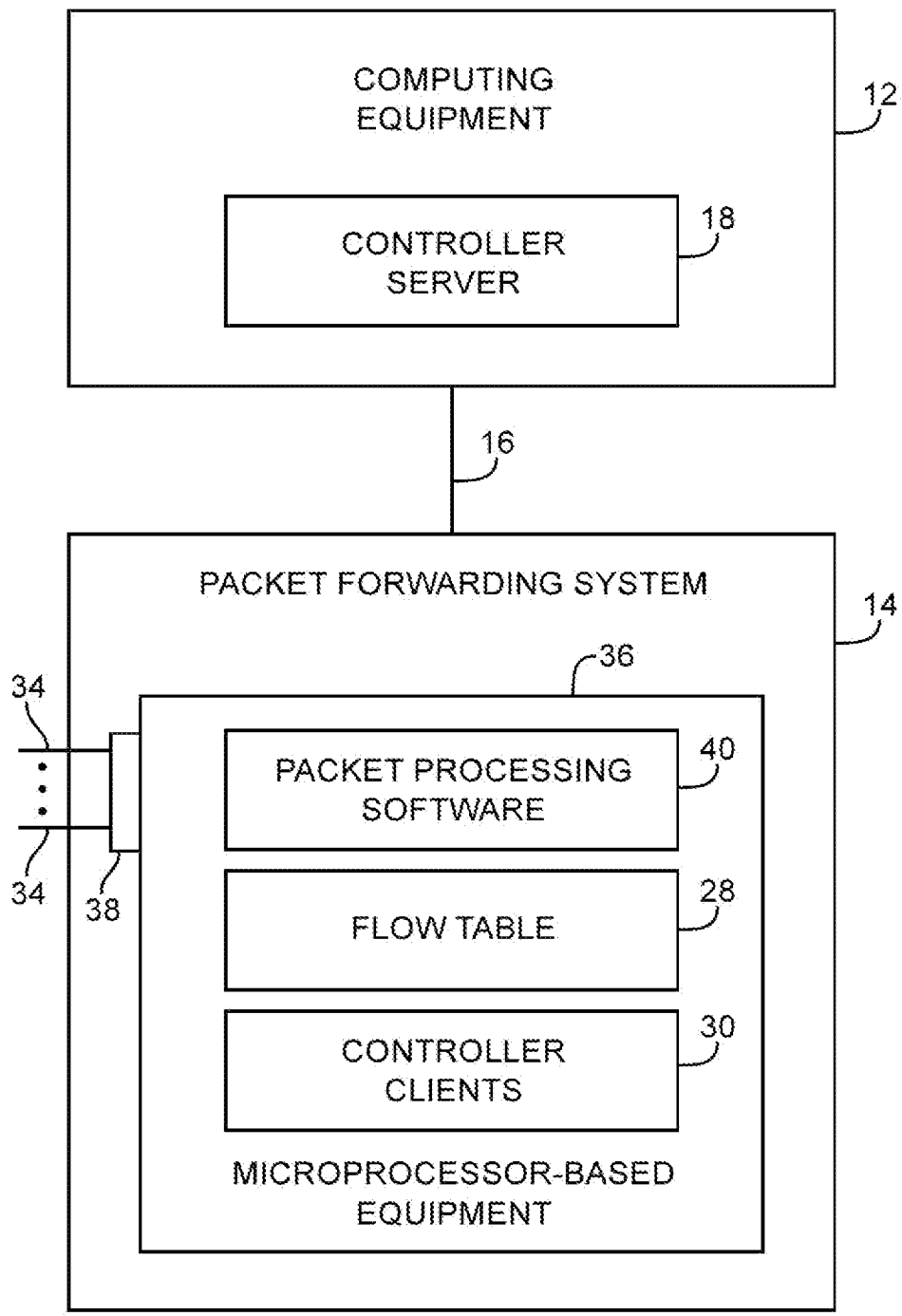
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 1. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
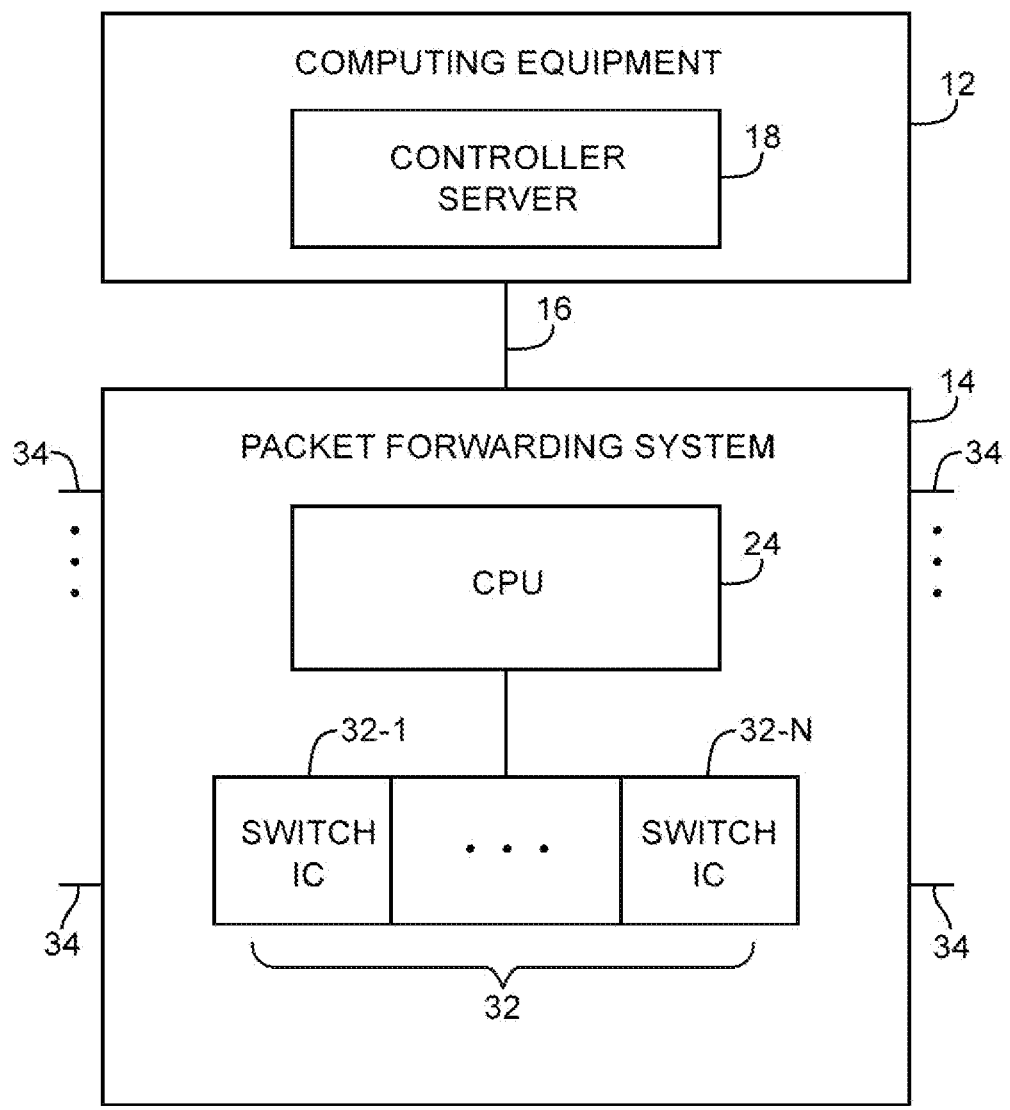
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
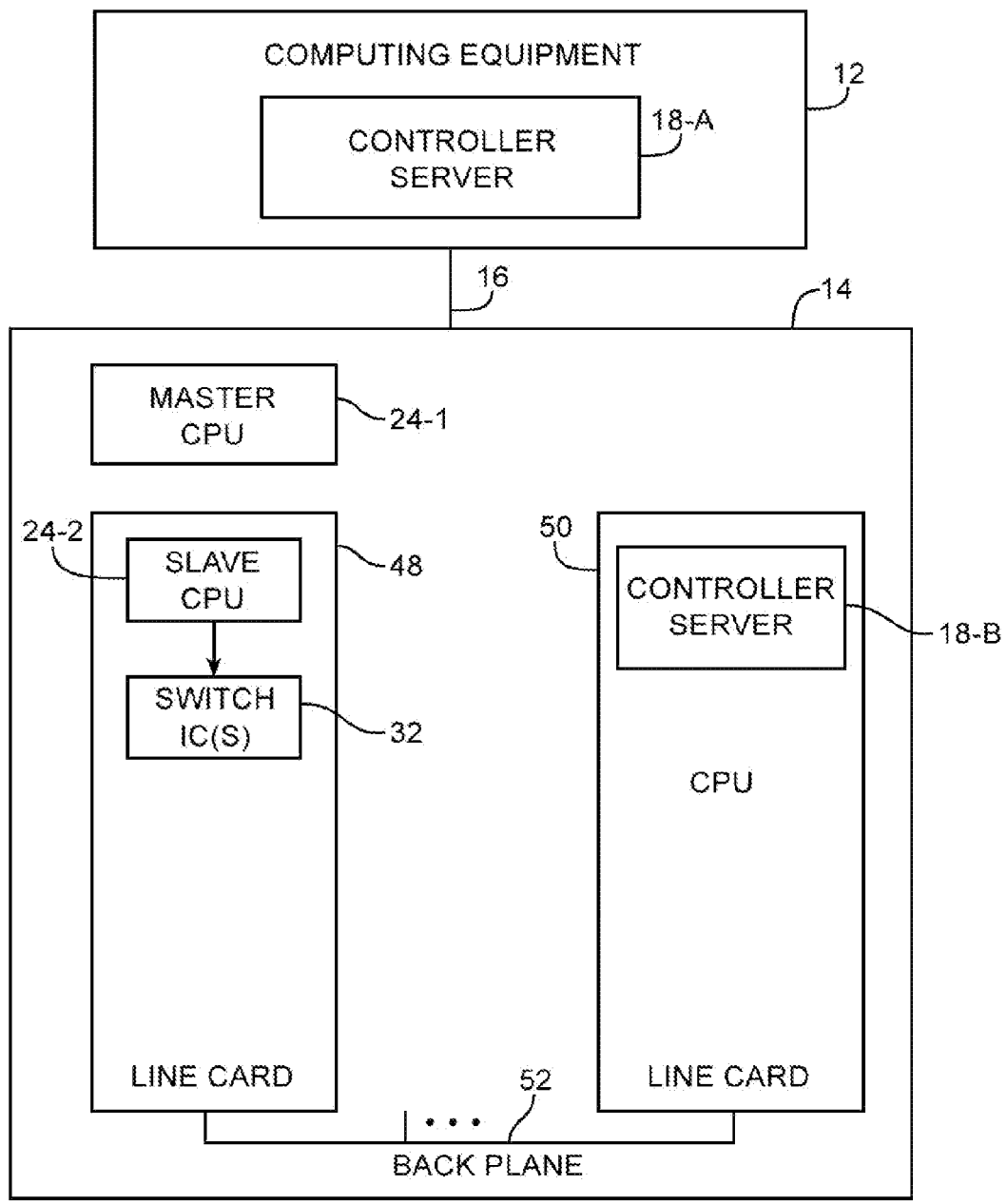
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
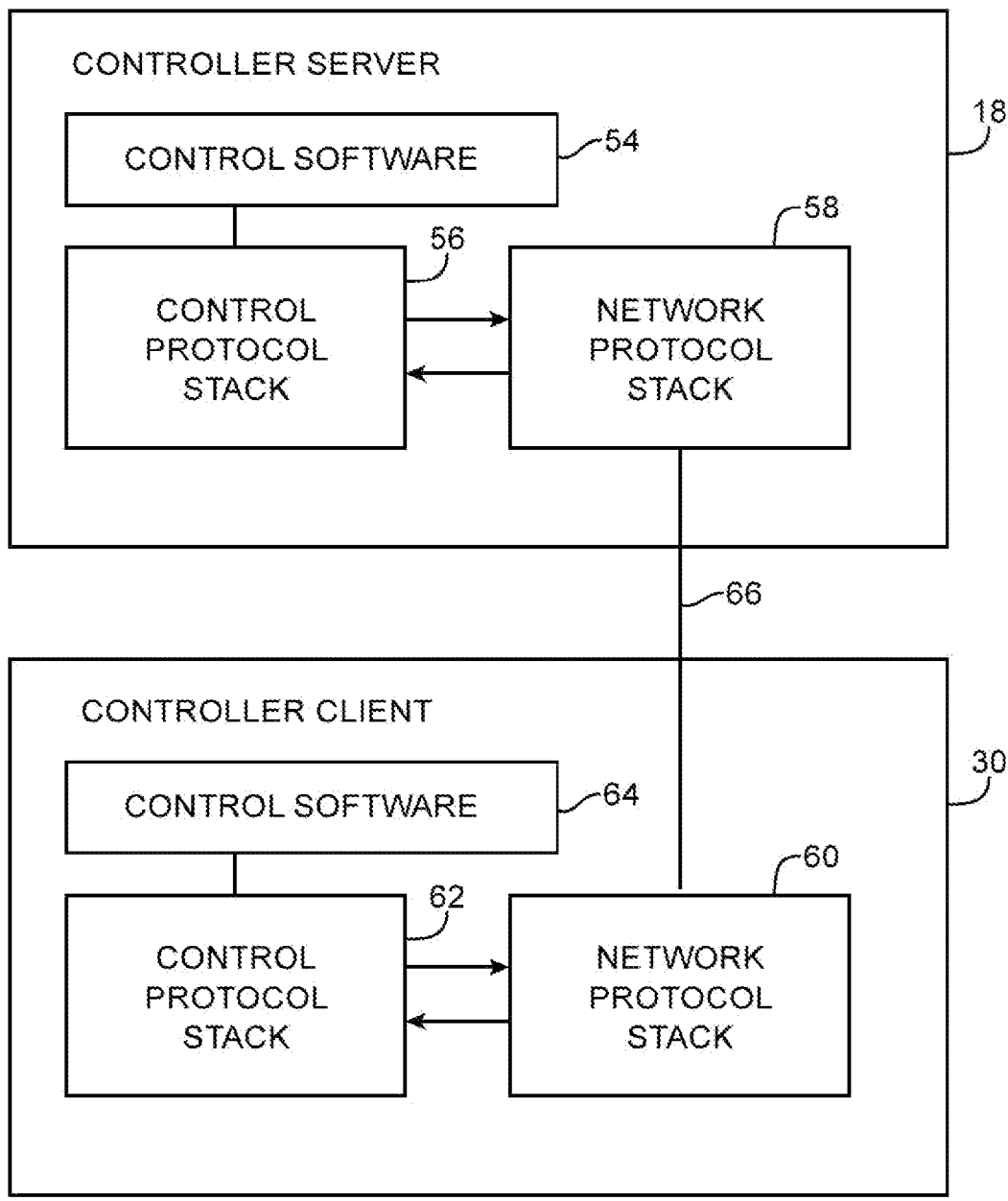
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
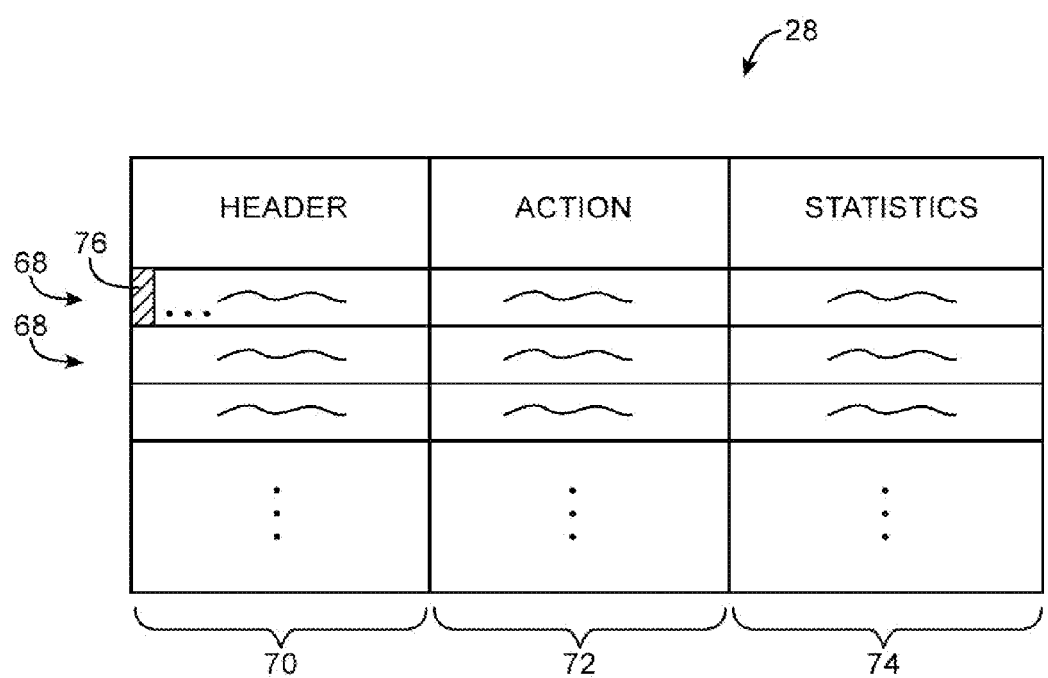
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
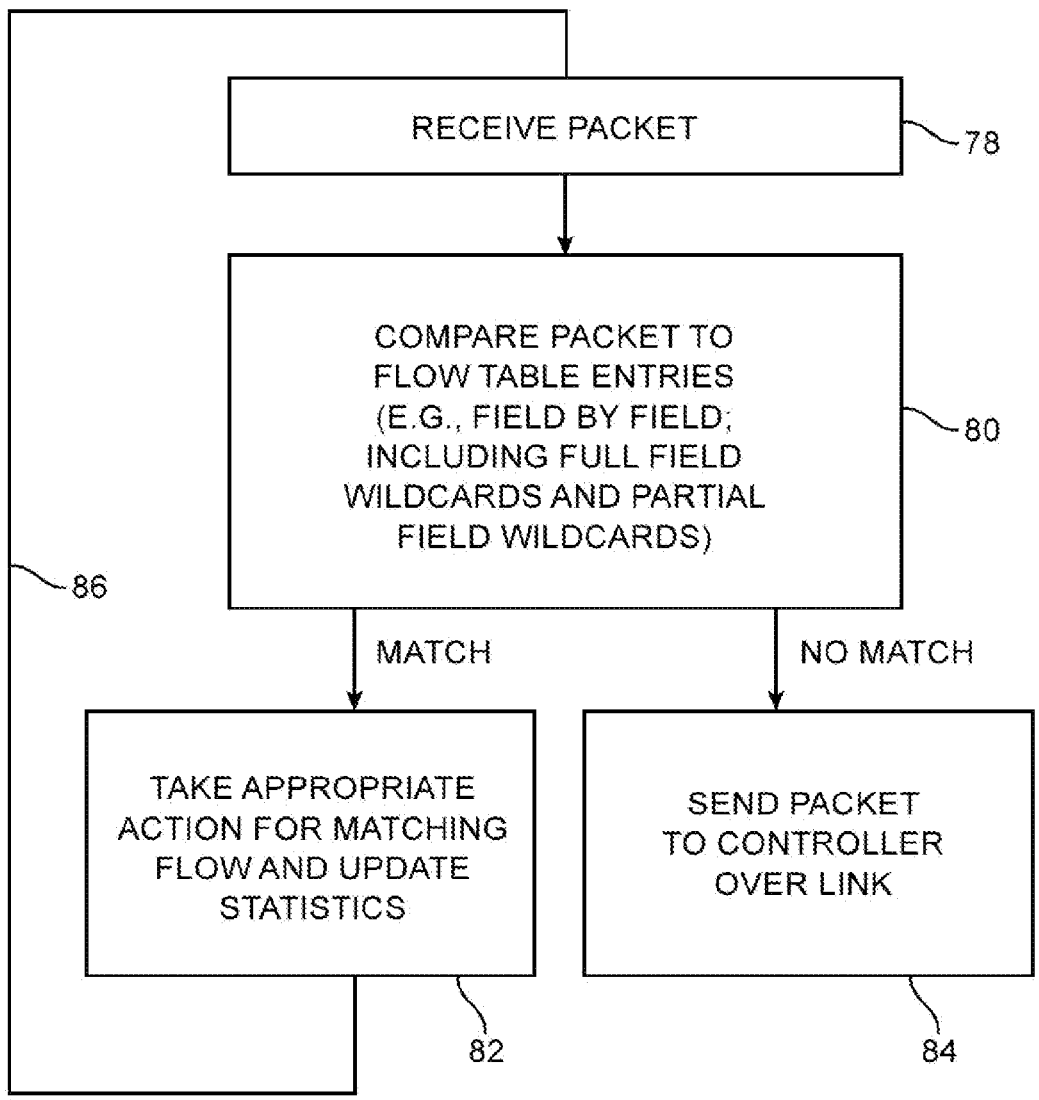
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 8:
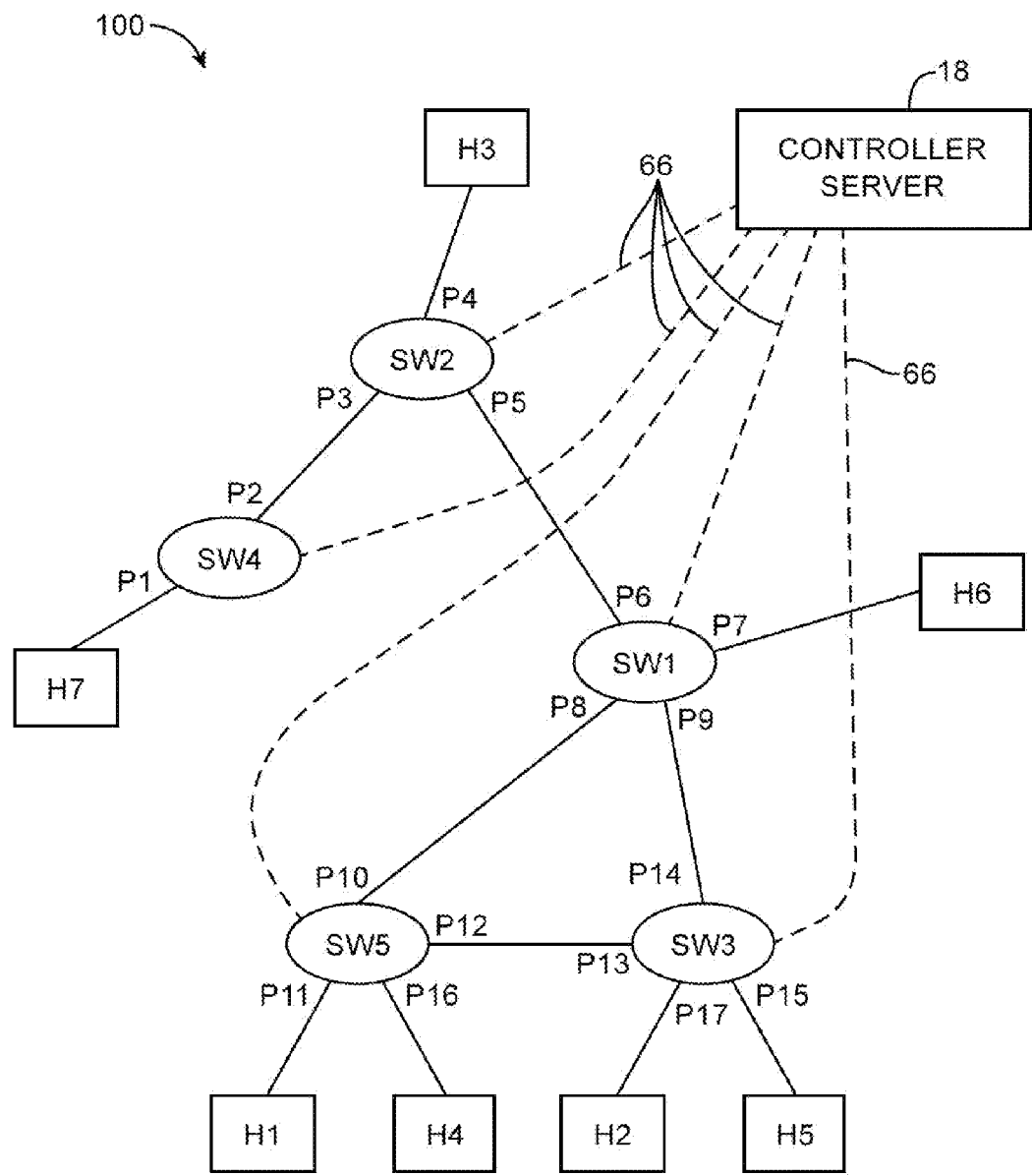
FIG. 8 is a diagram of an illustrative network that may be partitioned into broadcast domains in accordance with an embodiment of the present invention.

A controller (e.g., a controller server or other controllers implemented on computing equipment) may be used to control a network of switches. The controller may include one or more controller servers or may be distributed throughout one or more of the switches (e.g., portions of the controller may be implemented on storage and processing circuitry of multiple switches). FIG. 8 shows an illustrative network 100 with a controller server 18 that controls switches in network 100.

As shown in FIG. 8, network 100 may include end hosts (e.g., end hosts H1, H2, H3, H4, H5, H6, and H7) that are coupled to network switches in network 100 (e.g., switches SW1, SW2, SW3, SW4, and SW5). The switches may have ports to which end hosts or other switches may be coupled. For example, switch SW1 may have ports P6, P7, P8, and P9 that are coupled to switch SW2, end host H6, switch SW5, and switch SW3, respectively. As another example, switch SW4 may have ports P1 and P2 that are coupled to end host H7 and switch SW2, respectively.

Network 100 may include one or more controllers such as controller server 18. Controller server 18 may be used to control switches (e.g., switches SW1, SW2, SW3, etc.) via network paths 66. For example, controller server 18 may provide flow table entries to the switches over network paths 66.

End hosts in the network can communicate with other end hosts by transmitting packets that are forwarded by switches in the network. For example, end host H1 may communicate with other end hosts by transmitting network packets to port P11 of switch SW5. In this scenario, switch SW5 may receive the network packets and forward the network packets along appropriate network paths (e.g., based on flow table entries that have been provided by controller server 18).

Switches such as switch SW5 may forward network packets based on information such as destination network addresses retrieved from network packets. For example, switch SW5 may retrieve destination Media Access Control (MAC) address information from the network packets that identifies which end host(s) the network packets should be forwarded to. End hosts in the network may sometimes send broadcast packets that are destined for all other end hosts in the network. For example, end host H1 may send a broadcast packet by transmitting a network packet with a broadcast destination MAC address. In this scenario, switches in the network that receive the broadcast packet may identify the broadcast destination MAC address and forward the broadcast packet to all other end hosts in the network.

It may be desirable to isolate some of the end hosts from other end hosts by controlling which end hosts receive broadcast packets from any given end host. For example, isolating groups of end hosts from end hosts may improve network security (e.g., because end hosts in a first group may be prevented from communicating with end hosts in a second group). Controller server 18 may be used to partition network 100 into broadcast domains formed from groups of end hosts. Controller server 18 may control switches in network 100 (e.g., by providing flow table entries to the switches) so that network packets received from end hosts in a given broadcast domain are only forwarded to other end hosts in that broadcast domain, thereby isolating broadcast domains from each other.

Figure 9:
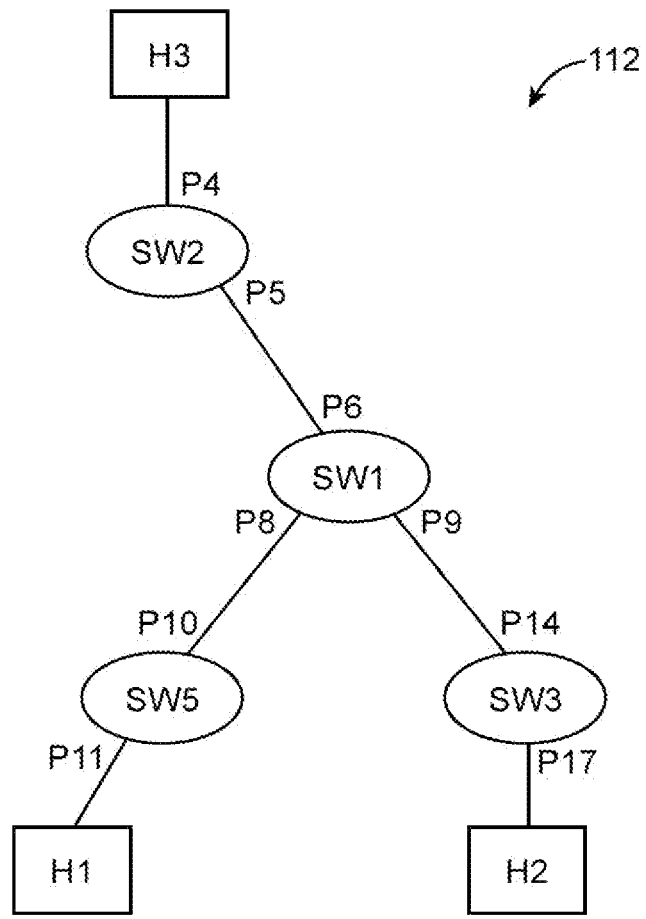
FIG. 9 is a diagram of a first broadcast domain that may be formed from a subset of end hosts of a network in accordance with an embodiment of the present invention.

FIG. 9 shows how network 100 of FIG. 8 may be partitioned into a broadcast domain formed from end hosts H1, H2, and H3 and an associated forwarding tree 112. Forwarding tree 112 may include network paths that couple each of the end hosts of the broadcast domain to the other end hosts of the broadcast domain. The network paths may be formed from switches and switch ports (interfaces). For example, a network path between end hosts H1 and H3 may be formed from ports P11 and P10 of switch SW5, ports P8 and P6 of switch SW1, and ports P5 and P4 of switch SW2. As another example, a network path between end hosts H1 and H2 may be formed from ports P11 and P10 of switch SW5, ports P8 and P9 of switch SW1, and ports P14 and P17 of switch SW3.

Forwarding tree 112 may be a minimum sized forwarding tree that includes a minimum number of switches and/or ports while ensuring that all end hosts of the associated broadcast domain are connected to each other. In other words, forwarding tree 112 may include a minimum number of switches and/or switch ports while ensuring that end hosts H1, H2, and H3 are coupled by network paths of forwarding tree 112. A forwarding tree 112 that includes a minimum number of switches and/or ports may sometimes be referred to as a spanning tree. This example is merely illustrative. Forwarding tree 112 may be formed of a forwarding tree that includes any desired number of switches and/or ports while ensuring that each end host of a given broadcast domain is linked to each other end host of that broadcast domain. Forwarding tree 112 may be computed by controller server 18 using network topology information. For example, controller server 18 may determine a forwarding tree 112 by performing greedy algorithms such as Kruskal's algorithm using the network topology information.

Forwarding tree 112 may be formed by providing switches in network 100 with appropriate flow table entries for forwarding broadcast packets from end hosts coupled to forwarding tree 112 to other end hosts that are coupled to forwarding tree 112. For example, switches SW1, SW2, SW3, and SW5 of network 100 may be provided with flow table entries that forward broadcast packets from end host H1 to end hosts H2 and H3 without forwarding the broadcast packets to end hosts H4, H5, H6, and H7.

Figure 10:
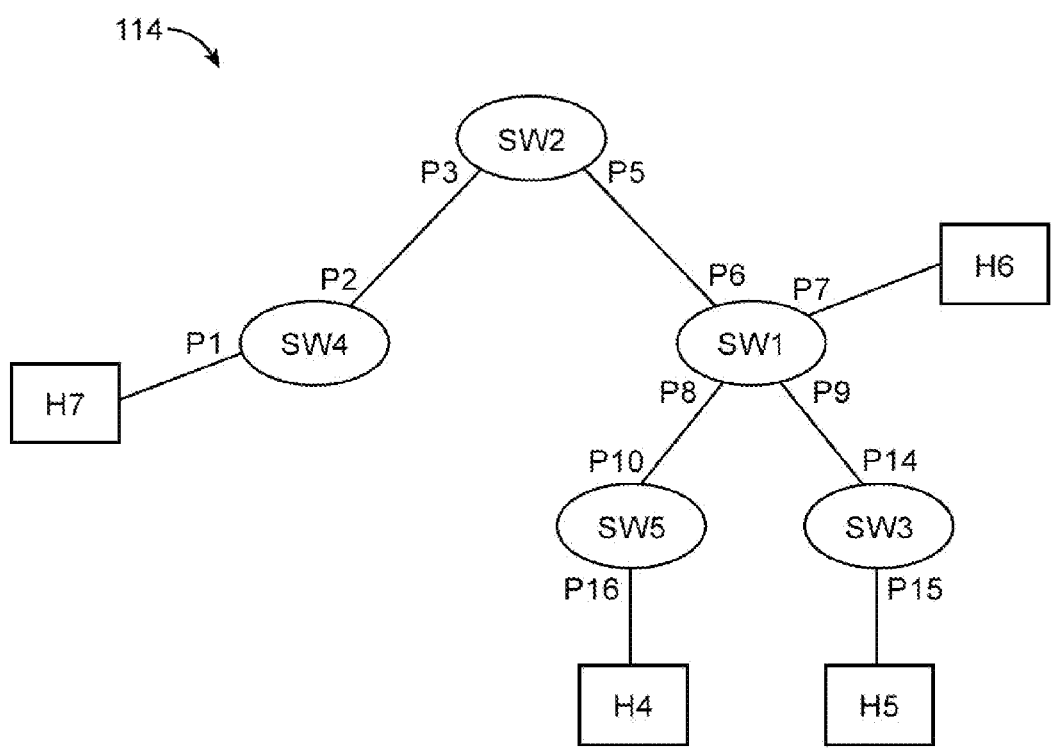
FIG. 10 is a diagram of a second broadcast domain that may be formed from a subset of end hosts of a network in accordance with an embodiment of the present invention.

FIG. 10 shows how a broadcast domain associated with end hosts H4, H5, H6, and H7 may be formed with an associated forwarding tree 114. Forwarding tree 114 may be formed substantially similar to forwarding tree 112 (e.g., forwarding tree 114 may be formed from network paths that connect end hosts H4, H5, H6, and H7 while reducing the number of switches and/or switch ports that are used to form forwarding tree 114). Switches associated with forwarding tree 114 may be provided with flow table entries (e.g., by controller server 18) that direct the switches to forward broadcast packets from end hosts associated with forwarding tree 114 (e.g., end hosts H4, H5, H6, or H7) to other end hosts associated with forwarding tree 114 without forwarding the broadcast packets to end hosts that are not associated with forwarding tree 114. As shown in FIG. 10, forwarding tree 114 may not include ports such as port P4 of switch SW2 and port P11 of switch SW5, because ports P4 and P11 may be coupled to end hosts H1 and H3 that are not associated with the broadcast domain of FIG. 10.

Figure 11:
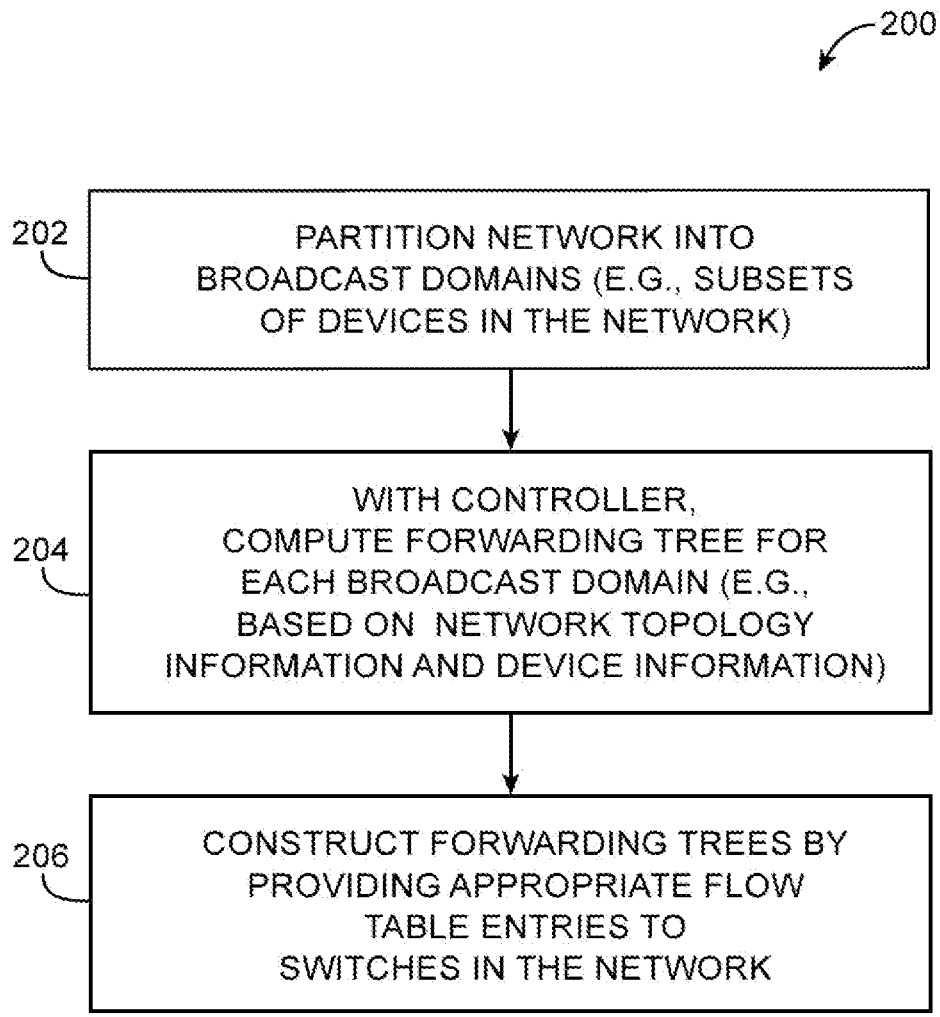
FIG. 11 is a flowchart of illustrative steps that may be performed by a controller to partition a network into broadcast domains in accordance with an embodiment of the present invention.

FIG. 11 is a flowchart 200 of illustrative steps that may be performed by a controller such as controller server 18 to partition a network such as network 100 into broadcast domains that are isolated from each other.

In step 202, the network may be partitioned into broadcast domains that are each associated with groups of end hosts in the network. In other words, the broadcast domains may be formed from subsets of devices in the network. The network may be partitioned by the controller using information received from a user such as a network administrator. For example, a network administrator may identify which end hosts are associated with each broadcast domain.

In step 204, the controller may compute a forwarding tree for each broadcast domain. The forwarding tree for a given broadcast domain may include network paths that couple each end host of that broadcast domain to each other end host of that broadcast domain. For example, the controller may determine forwarding trees 112 and 114 for the broadcast domains of network 100 of FIG. 8. The forwarding trees may be computed so that end hosts associated with each broadcast domain are isolated from end hosts associated with other broadcast domains.

The forwarding trees may be determined based on network topology information such as information relating to connections between network switches and between network switches and end hosts. The network topology information may be gathered and/or monitored by the controller. For example, the controller may gather the network topology information from the switches in the network (e.g., via network paths 66).

In step 206, the controller may construct the forwarding trees by providing appropriate flow table entries to switches in the network. The flow table entries provided to each switch in the network to form the forwarding trees may be formed based on which network devices are coupled to that switch. For example, flow table entries may be provided to a given switch in the network for each end host that is coupled to the switch and for each other switch that is coupled to the given switch. Flow table entries provided to a network switch for end hosts that are coupled to that switch may be referred to as switch-host flow table entries, because the flow table entries may correspond to network links between network switches and end hosts. Flow table entries that are provided to the network switch for other network switches that are coupled to the network switch may be referred to as switch-switch flow table entries.

Figure 12:
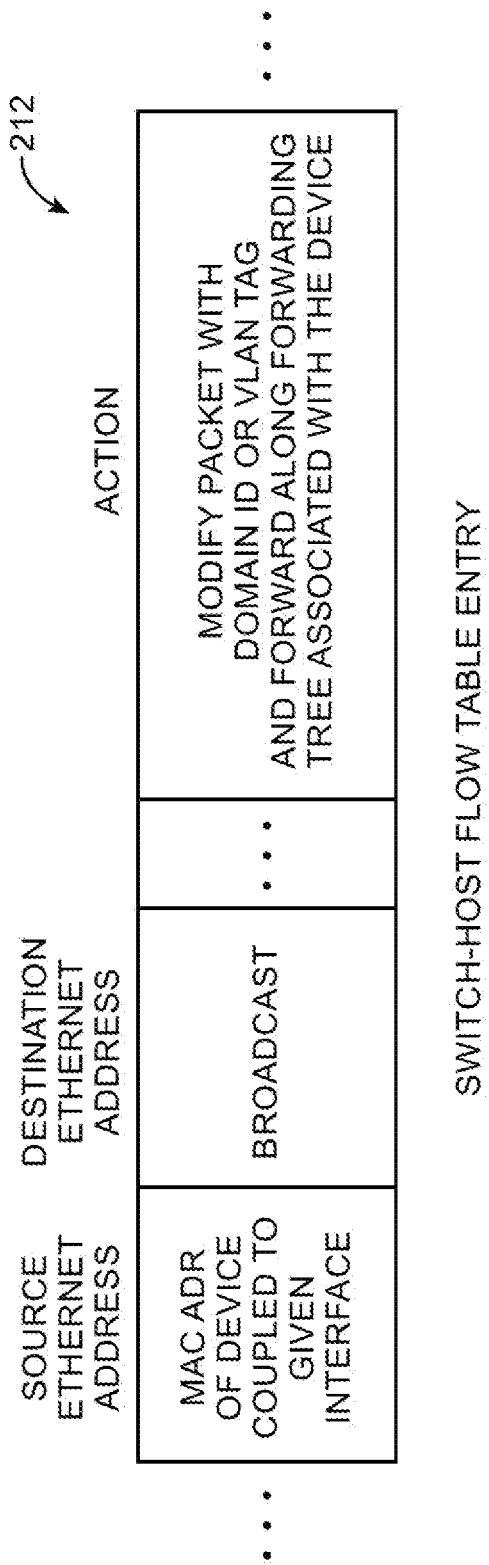
FIG. 12 is an illustrative switch-host flow table entry that may be provided by a controller to network switches in accordance with an embodiment of the present invention.

FIG. 12 is an illustrative switch-host flow table entry 212 that may be provided (e.g., by a controller such as controller server 18) to a given switch for each end host that is coupled to ports of that switch. As shown in FIG. 12, switch-host flow table entry 212 may include a source Ethernet address field (e.g., for storing hardware addresses such as MAC addresses), a destination Ethernet address field, and an action field. The source Ethernet address field may include the source Ethernet address of the end host (e.g., network device) that is coupled to a given interface (e.g., port) of that switch. The destination Ethernet address field may include a broadcast address such as 0xFFFFFF or 0x800000. Instructions stored in the action field may direct the switch to modify and/or forward network packets that match the source Ethernet address and destination Ethernet address fields of switch-host flow table entry 212. The packets may be modified with broadcast domain information such as a domain identification (ID) or a VLAN tag and forwarded along a forwarding tree associated with the device that sent the network packets (e.g., a forwarding tree associated with the broadcast domain of the device that sent the network packets). The broadcast domain information stored in the packets may sometimes be referred to as a broadcast domain identifier.

The broadcast domain information may identify which broadcast domain is associated with a given network packet. For example, each broadcast domain may be assigned a different domain identification (sometimes referred to as a domain identifier). The domain identification may be stored in header fields of the network packet. For example, the domain identification may be encoded as a 47-bit value and stored in a portion of a destination Ethernet address header field of the network packet. This example is merely illustrative. If desired, the broadcast domain information may be stored as a domain identification and/or VLAN tag encoded with any desired number of data bits and stored in any desired header field of the network packet. The domain information stored in the network packet may be used by switches that receive the packet to determine which end hosts in the network should be provided with the network packet (e.g., the domain identification may be used by the switches to determine which forwarding tree is to be used for forwarding the network packet).

Figure 13A:
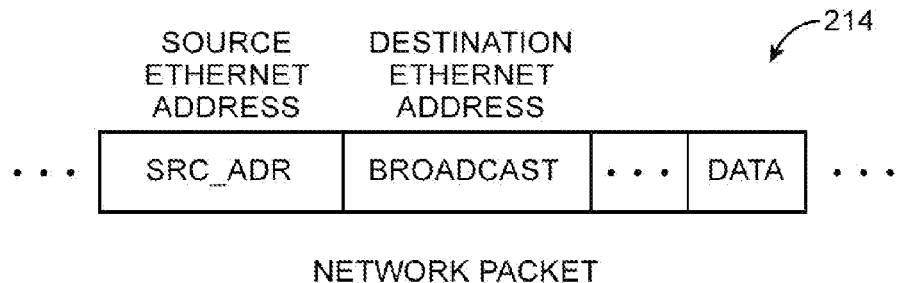
FIG. 13A is an illustrative broadcast network packet that may be received by network switches in accordance with an embodiment of the present invention.

FIG. 13A is an illustrative broadcast network packet 214 that may be sent through a network by end hosts such as end hosts H1, H2, etc. of FIG. 8. Network packet 214 may include a source Ethernet address SRC_ADR, a broadcast destination Ethernet address, and network packet data (e.g., data sent from an end host to other end hosts). If desired, the network packet may include other fields such as internet protocol (IP) address fields, network protocol port fields, a virtual local area network (VLAN) tag field, etc.

Figure 13B:
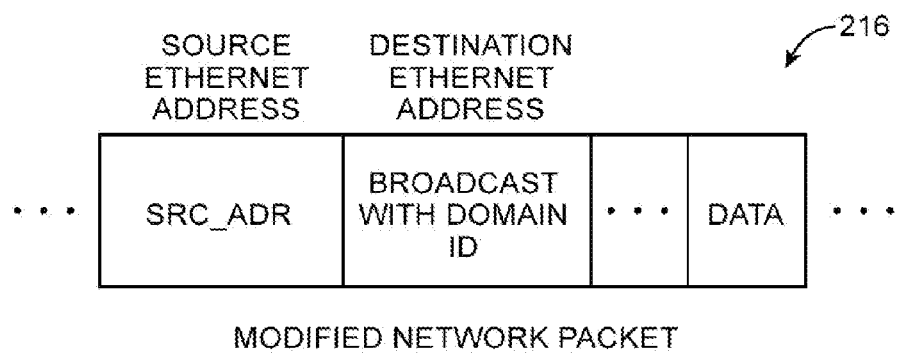
FIG. 13B is an illustrative modified network packet with broadcast domain information that is stored in a destination Ethernet address field in accordance with an embodiment of the present invention.

Switches in the network may be configured by a controller (e.g., by providing the switches with flow table entries having appropriate action fields) to modify network packets received from end hosts by storing broadcast domain information as domain identification values in destination Ethernet address fields of the network packets. FIG. 13B is an illustrative modified network packet 216 that may be formed by network switches using network packet 214 and flow table entries that have been provided to the network switches by a controller such as controller server 18 (e.g., by modifying network packet 214 based on actions defined by the flow table entries). Modified network packet 216 may be formed by storing an appropriate domain identification value in a portion of the destination Ethernet address field of network packet 216. For example, the destination Ethernet address field may include 48 bits, whereas the domain identification may include 47 bits. In this scenario, the domain identification value may be stored as the least significant 47 bits of the Ethernet address field and a logic one value may be stored as the most significant bit of the destination Ethernet address field. The logic one value stored in the most significant bit of the destination Ethernet address field may identify (e.g., to other network switches) that modified network packet 216 is a broadcast packet, whereas the domain identification may identify which broadcast domain is associated with the network packet.

As an example, consider the scenario in which the broadcast domain of FIG. 9 has been assigned a domain identification of 100 (e.g., assigned by a network administrator). In this scenario, if end host H1 transmits a broadcast network packet to port P11 of switch SW5, switch SW5 may receive the broadcast network packet and use flow table entries such as switch-host flow table entry 212 that have been provided to switch SW5 by controller server 18 to determine how to process the received network packet. Switch SW5 may use the flow table entries to identify that the network packet is a broadcast packet (e.g., by comparing the destination Ethernet address field of the network packet to the destination Ethernet address field of switch-host flow table entry 212) and generate a modified network packet 216 by modifying the network packet with the domain identification of the broadcast domain (e.g., by storing a domain identification value of 100 in the least significant 47 bits of the destination Ethernet address field and storing a logic one in the most significant bit of the destination Ethernet address field). Network switch SW5 may then forward the modified network packet to other end hosts in the broadcast domain (e.g., end hosts H2 and H3) by forwarding the network switch along forwarding tree 112 (e.g., the forwarding tree associated with the broadcast domain of end host H1).

Figure 13C:
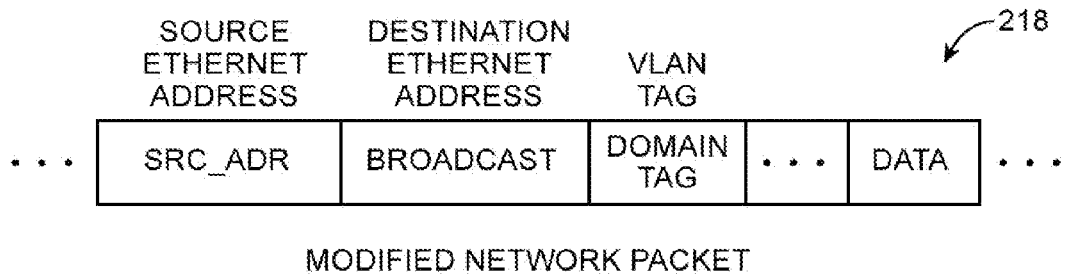
FIG. 13C is an illustrative modified network packet with broadcast domain information that is stored in a virtual local area network (VLAN) tag field in accordance with an embodiment of the present invention.

The example of FIG. 13B in which network switches are configured to store broadcast domain information as a domain identification value in destination Ethernet address fields of broadcast network packets is merely illustrative. If desired, broadcast domain information may be stored in other fields of network packets. FIG. 13C is an illustrative modified network packet 218 in which broadcast domain information may be stored in a virtual local area network (VLAN) tag field (sometimes referred to as a VLAN identifier).

Modified network packet 218 may be generated by network switches by storing broadcast domain information as domain tags (e.g., domain identifiers) in VLAN tag fields of network packets that are received from end hosts. The domain tag may include a number of bits suitable for storing in the VLAN tag fields. For example, the VLAN tag field may be 12 bits. In this scenario, the domain tag stored in each network packet may be a 12-bit value assigned to the broadcast domain of the end host that sent the network packet (e.g., each broadcast domain may be assigned a different 12-bit domain tag).

Figure 14A:
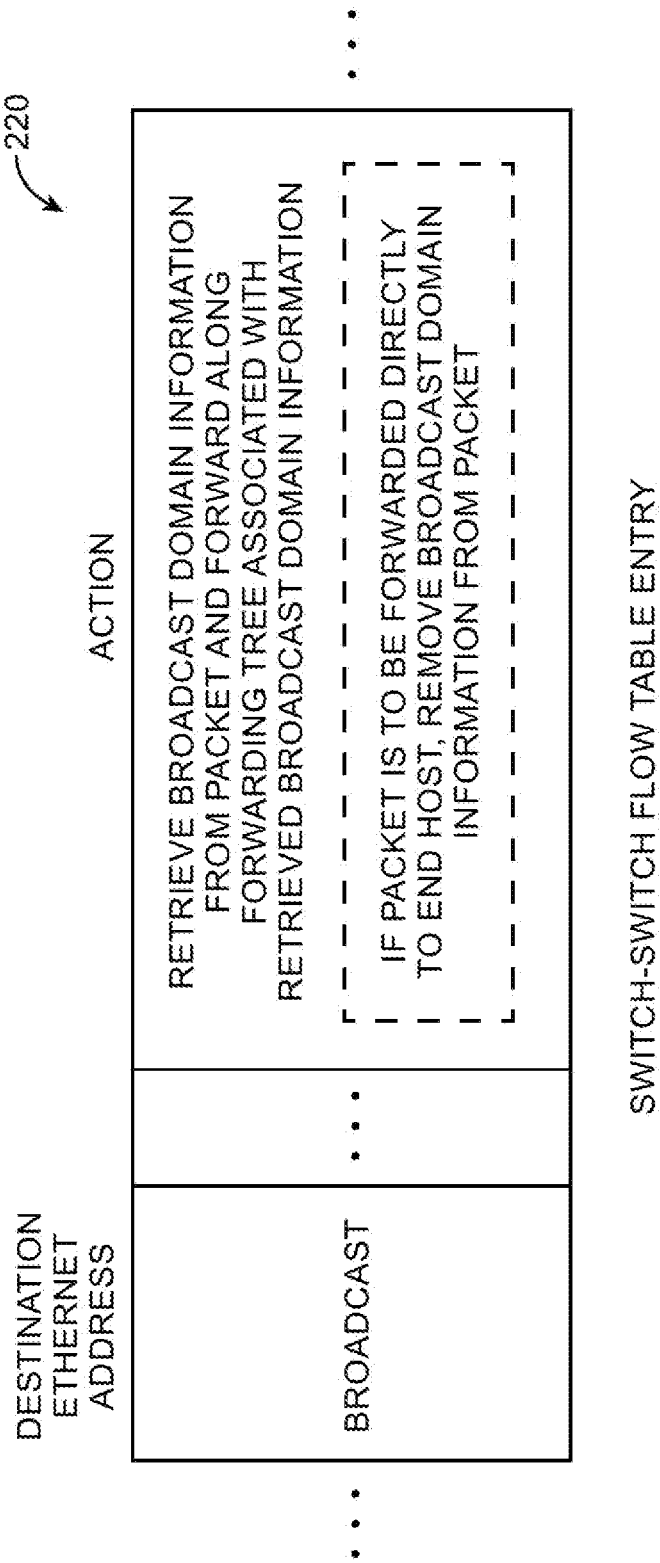
FIG. 14A is an illustrative switch-switch flow table entry that may be provided by a controller to network switches in accordance with an embodiment of the present invention.
Figure 14B:
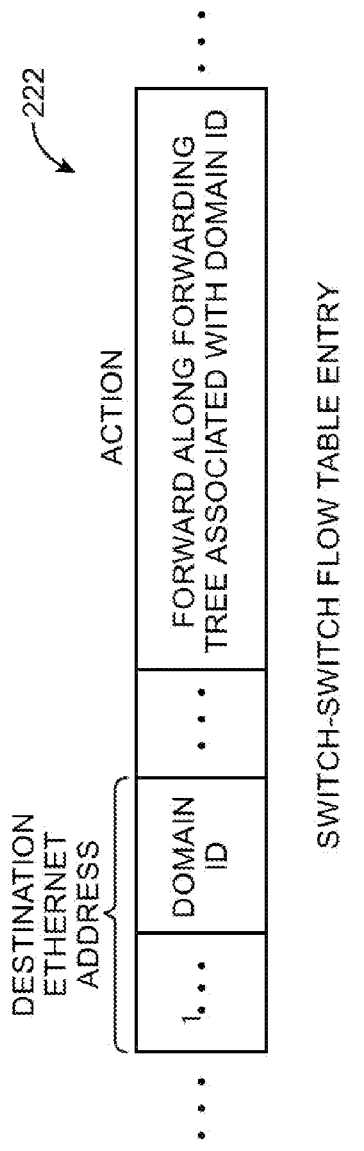
FIG. 14B is an illustrative switch-switch flow table entry that matches network packets having broadcast domain information stored in destination Ethernet address fields in accordance with an embodiment of the present invention.
Figure 14C:
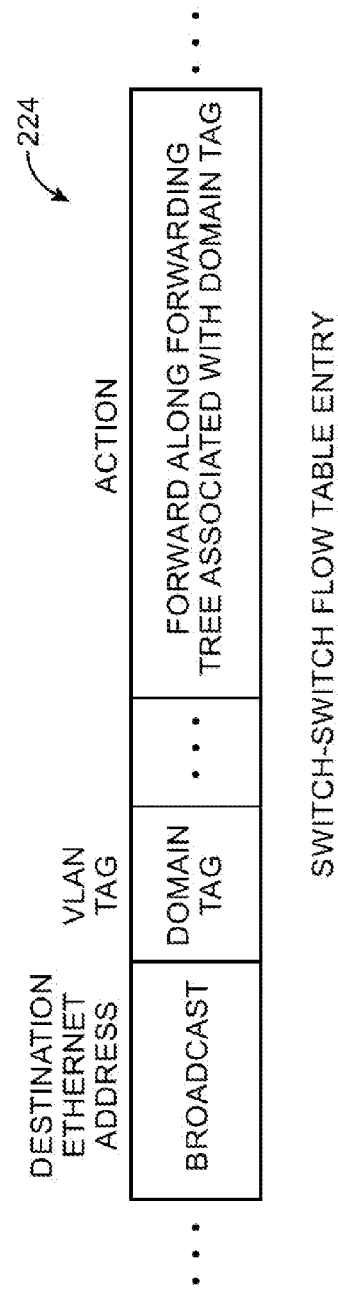
FIG. 14C is an illustrative switch-switch flow table entry that matches network packets having broadcast domain information stored in VLAN tag fields in accordance with an embodiment of the present invention.

Network switches may be provided with flow table entries associated with broadcast network packets that have been modified by other network switches. The flow table entries may sometimes be referred to as switch-switch flow table entries, because the flow table entries are associated with broadcast packets forwarded between network switches. FIGS. 14A, 14B, and 14C are illustrative switch-switch flow table entries that may be provided (e.g., by a controller such as controller server 18) to network switches.

As shown in FIG. 14A, switch-switch flow table entry 220 may include a destination Ethernet address field and an action field. The destination address field may include a broadcast address value that is used by network switches that are provided with flow table entry 220 to identify which network packets match flow table entry 220. For example, the destination address field may include broadcast address 0xFFFFFF, 0x800000, or other broadcast address values. If desired, the destination address field may include partial wildcarding so that multiple broadcast addresses are matched to flow table entry 220. For example, the destination address field may include wildcarding so that only the most significant bit of destination Ethernet address fields of network packets is used for matching (e.g., so that any network packets that have a destination Ethernet address with a most significant bit of logic one may match flow table entry 220).

Switch-switch flow table entry 220 may include an action field that directs network switches that have been provided with flow table entry 220 to retrieve broadcast domain information from network packets that match the destination address field of flow table entry 220 (e.g., network packets that have a broadcast destination Ethernet address). The broadcast domain information (e.g., identifiers) may be retrieved from destination Ethernet address fields of the network packets (e.g., from domain identification stored in the destination Ethernet address fields by other network switches), from VLAN tag fields, or from other network packet fields. Flow table entry 220 may direct the network switches to forward the network packets along a forwarding tree associated with the retrieved broadcast domain information.

If desired, the action field of switch-switch flow table entry 220 may optionally include instructions that direct network switches that have been provided with flow table entry 220 to remove broadcast domain information from packets that are to be forwarded directly to end hosts. For example, consider the scenario in which switch SW3 receives modified network packet 216 that has a domain identification associated with end host H2. In this scenario, switch SW3 may remove the broadcast domain information from modified network packet 216 before forwarding network packet 216 to end host H2. The broadcast domain information may be removed by replacing the domain identification with logic one values (e.g., by storing a broadcast address of 0xFFFFFF in the destination Ethernet address field of network packet 216). It is appreciated that similar processes may be performed to remove broadcast domain information stored in VLAN tag fields or other header fields of network packets. By removing the broadcast domain information from network packets, end hosts such as end host H2 may be isolated from broadcast domain isolation processes.

As shown in FIG. 14B, switch-switch flow table entry 222 may include a destination Ethernet address field that is partially occupied by a domain identification. The destination Ethernet address field may have a bit width (e.g., 48 bits). The domain identification may have a bit width that is less than a bit width of the destination Ethernet address field (e.g., the domain identification may have a bit width of 47 bits). The domain identification may be stored as the least significant portion of the destination Ethernet address field. The remaining most significant bits of the Ethernet address field may be provided with logic one values (e.g., to identify broadcast network packets).

Switch-switch flow table entry 222 may include an action field that directs network switches that are provided with flow table entry 222 to forward network packets that match the destination Ethernet address fields (e.g., network packets such as modified network packet 216 of FIG. 13B) along a forwarding tree associated with the domain identification of the destination Ethernet address field.

As shown in FIG. 14C, switch-switch flow table entry 224 may include a broadcast destination Ethernet address and a VLAN tag field in which a domain tag is stored. Each domain tag may correspond to a different broadcast domain. Switch-switch flow table entry 224 may include an action field that directs network switches that are provided with flow table entry 224 to forward network packets that match the VLAN tag field (e.g., that have the domain tag stored in VLAN tag fields of the network packets) along a forwarding tree associated with the domain tag (e.g., so that the network packets are forwarded only to end hosts that are associated with the broadcast domain associated with the domain tag).

Figure 15:
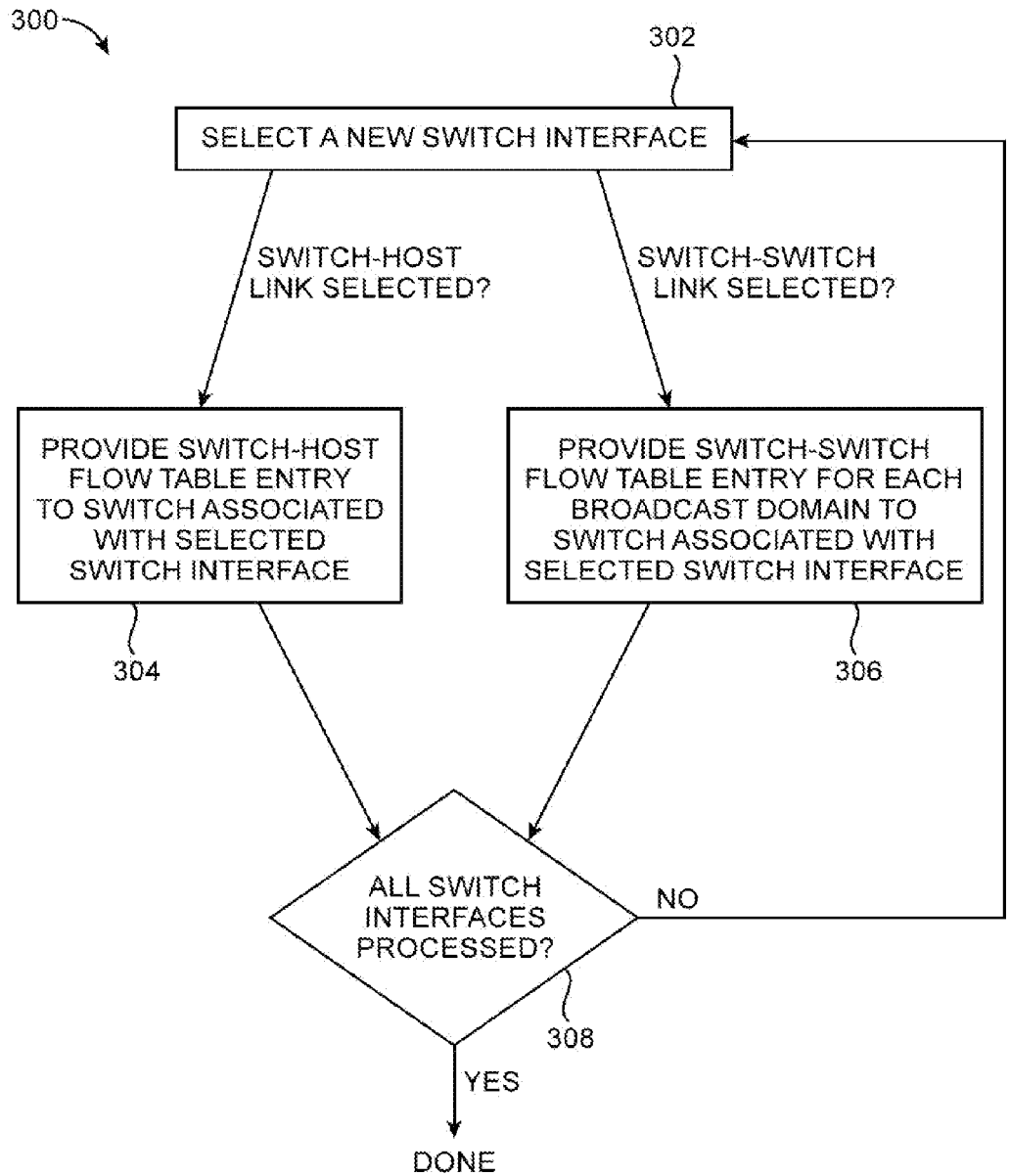
FIG. 15 is a flowchart of illustrative steps that may be performed by a controller to provide flow table entries to network switches for isolating broadcast domains in accordance with an embodiment of the present invention.

A controller such as controller server 18 may be used to provide network switches in a network with appropriate flow table entries (e.g., switch-host flow table entry 212 or switch-switch flow table entry 220) so that broadcast domains are isolated from each other. FIG. 15 is an flowchart 300 of illustrative steps that may be performed by a controller to provide switches in a network such as network 100 of FIG. 8 with appropriate flow table entries so that network packets sent from end hosts in the network are forwarded along appropriate forwarding trees (e.g., so that the network packets are forwarded to end hosts of the same broadcast domains of the end hosts that sent the network packets). The flow table entries provided to network switches may isolate broadcast domains from each other (e.g., so that network packets associated with a given broadcast domain are not forwarded to other broadcast domains). The steps of flowchart 300 may, if desired, be performed during step 206 of FIG. 11 to provide network switches with appropriate flow table entries to construct forwarding trees for broadcast domains.

In step 302, the controller may select a new network switch interface from the interfaces of the network switches. The network switch interface may correspond to a port of the switch. For example, the controller may select port P1 of switch SW4 of FIG. 8. As another example, the controller may select port P16 of switch SW5. If desired, the controller may select the new network switch interfaces from interfaces that are known to be coupled to network devices (e.g., coupled to network switches or end hosts).

The controller may use network topology information (e.g., network topology information gathered and/or monitored from the network switches by the controller) to determine whether the selected network switch interface (e.g., network switch port) is associated with a switch to host (switch-host) network connection (link) or a switch to switch (switch-switch) link. For example, the controller may maintain a database of which network switch ports are coupled to end hosts and which network switch ports are coupled to other network switch ports. In this scenario, the controller may use the database to determine whether the selected switch interface corresponds to a switch-host link or switch-switch link. In response to determining that the selected switch interface corresponds to a switch-host link, the controller may perform the operations of step 304. In response to determining that the selected switch interface corresponds to a switch-switch link, the controller may perform the operations of step 306. In step 304, the controller may generate a switch-host flow table entry and provide the switch-host flow table entry to the network switch associated with the selected switch interface. The switch-host flow table entry may be provided to the network switch via network paths such as network paths 66 of FIG. 8.

As an example, consider the scenario in which port P11 of switch SW5 of network 100 of FIG. 8 is selected by the controller (e.g., during step 302). In this scenario, the controller may generate a switch-host flow table entry 212 for the host that is coupled to port P11 (e.g., end host H1). The controller may form the switch-host flow table entry 212 with the MAC address of end host H1 stored in the source Ethernet address field, a broadcast address stored in the destination Ethernet address field, and an action field that directs switch SW5 to modify and forward network packets that match the source Ethernet address field and destination Ethernet address field (e.g., broadcast network packets from end host H1). The network packets may be modified with broadcast domain information associated with end host H1 (e.g., with a domain identification) and forwarded along a forwarding tree associated with end host H1 (e.g., forwarding tree 112 of FIG. 9).

In step 306, the controller may generate a switch-switch flow table entry for each broadcast domain and provide the switch-switch flow table entry to the network switch associated with the selected switch interface (port). For example, consider the scenario in which port P2 of switch SW4 is selected during step 302. In this scenario, the controller may generate a switch-switch flow table entry (e.g., switch-switch flow table entry 220, 222, or 224) for each broadcast domain of the network. By providing the network switch with a switch-switch flow table entry for each broadcast domain, network packets associated with each broadcast domain may match a different switch-switch flow table entry and be forwarded along an appropriate forwarding tree (e.g., so that network packets associated with a given broadcast domain are not forwarded to other broadcast domains).

In step 308, the controller may determine whether all network switch interfaces have been processed (e.g., by steps 302-306). If all network switch interfaces have been processed, the process is finished. If network switch interfaces remain that have not been processed, the process returns to step 302 to select a new switch interface for processing.

Figure 16:
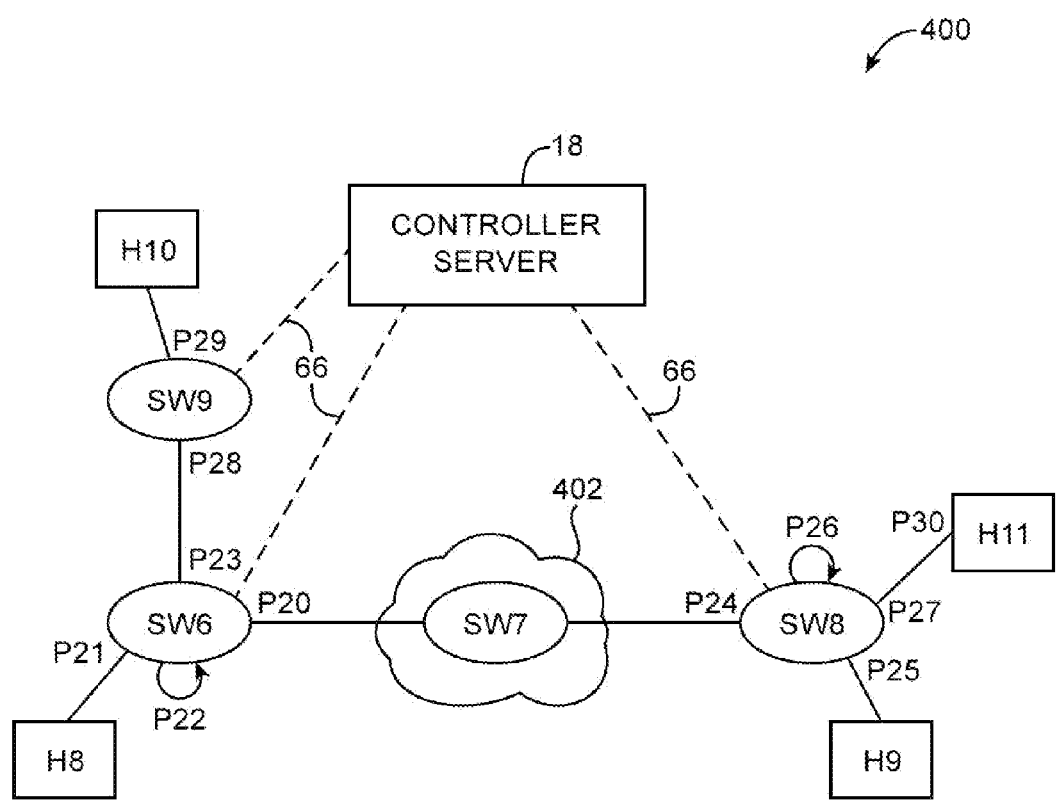
FIG. 16 is an illustrative network having client switches that are separated by non-client switches in accordance with an embodiment of the present invention.

In some scenarios, a network may be formed from switches that have controller clients (and therefore are controlled by a controller server) and switches that do not have controller clients (e.g., switches that are not controlled by the controller server). The switches with controller clients may be referred to as client switches. The switches that do not have controller clients may be referred to as non-client switches. FIG. 16 is an illustrative scenario in which a network 400 is formed from client switches (e.g., switches SW6, SW8, and SW9) and non-client switches (e.g., switch SW7). The client switches may be controlled by a controller server 18 via network paths 66, whereas the non-client switches may not be controlled by controller server 18. The client switches may have ports (e.g., ports P20-P30) that are coupled to other switches and/or end hosts.

Some of the client switches may be separated by one or more non-client switches. For example, client switch SW6 may be separated from client switch SW8 by non-client switch network 402. Non-client switch network 402 is shown in FIG. 16 as a single non-client switch SW7, but, in general, non-client switch network 402 may include any desired number of non-client switches (e.g., one non-client switch, tens of non-client switches, hundreds of non-client switches, or more).

It may be desirable for controller server 18 to form a network tunnel between client switches that are separated by non-client switches (e.g., a network tunnel may be formed between port P20 of client switch SW6 and port P24 of client switch SW8). The network tunnel may be formed by providing the client switches with flow table entries that encapsulate and de-encapsulate network packets. The flow table entries may encapsulate and de-encapsulate network packets using a network protocol such as the Internet Protocol (IP), the Generic Routing Encapsulation protocol (GRE), one or more protocols from the Internet Protocol Security protocol suite (IPSec), the Layer 2 Tunneling Protocol (L2TP), the Virtual Extensible Local Area Network protocol (VXLAN), the Network Virtualization using Generic Routing Encapsulation protocol (NVGRE), the Control and Provisioning of Wireless Access Points protocol (CAPWAP), or other desired network protocols (e.g., network protocols associated with network tunneling).

As an example, controller server 18 may provide client switch SW6 with flow table entries that encapsulate network packets that are destined for client switch SW8 (e.g., flow table entries that modify network packets that are to be forwarded from port P20 by appending IP headers to the network packets before forwarding the network packets from port P20). In this scenario, controller server 18 may provide client switch SW8 with flow table entries that de-encapsulate the network packets (e.g., flow table entries that recover original network packets by removing IP headers from the encapsulated network packets). By encapsulating the network packets using a network protocol associated with network tunneling, the network packets may be correctly forwarded through non-client switch network 402 (e.g., because encapsulation information such as IP headers may be used by the non-client switches to determine that the encapsulated network packets should be forwarded to client switch SW8).

Packet forwarding systems such as network switches that are controlled by controller server 18 may have limited packet processing capabilities (e.g., packet forwarding capabilities). For example, a client switch that modifies network packets may be unable to send different versions of the modified network packets to different ports of the client switch. The client switch may receive a broadcast network packet and produce a single modified network packet for forwarding from ports of the client switch. Because of these limited processing capabilities, the client switch may be unable to accommodate scenarios in which it is desirable to forward an encapsulated network packet (e.g., for network tunneling) in parallel with a modified network packet (e.g., for broadcast domain isolation). In other words, a client switch that receives a network packet may be unable to send a first modified version of the network packet from a first port of the client switch in parallel with a second modified version of the network packet from a second port of the client switch.

To accommodate network tunneling and broadcast domain isolation in parallel, client switches may be provided with loopback ports (interfaces). For example, client switch SW6 may be provided with loopback interface P22 and client switch SW8 may be provided with loopback interface P26. Network packets that are forwarded from loopback ports may be returned via the same port (e.g., a network packet that is forwarded by client switch SW6 from loopback port P22 may be returned to client switch SW6 for processing via loopback port P22).

Figure 17:
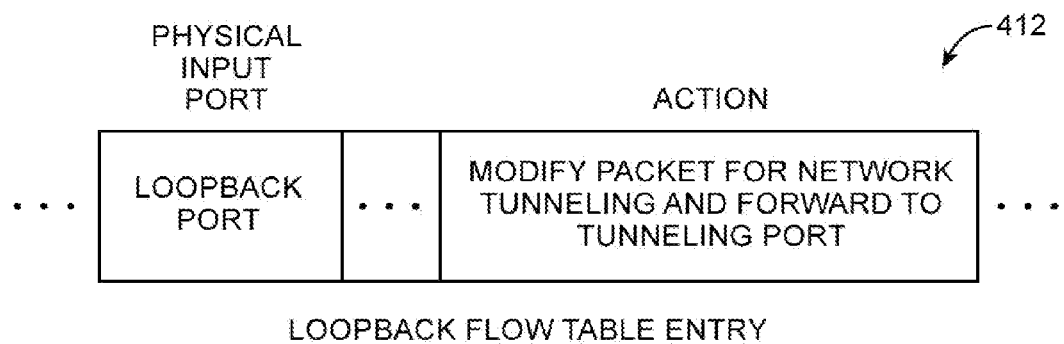
FIG. 17 is an illustrative loopback flow table entry that may be used to accommodate network switches with limited packet processing capabilities.

Controller server 18 may configure client switches so that broadcast network packets that are to be forwarded from tunneling ports (e.g., network switch ports associated with network tunneling) are instead forwarded through loopback ports. For example, controller server 18 may use network topology information during steps 204 and 206 of FIG. 11 to compute forwarding trees and provide appropriate flow table entries to client switches so that broadcast network packets are forwarded from loopback ports instead of network tunneling ports. Controller server 18 may provide the client switches with flow table entries so that network packets that are received from the loopback ports (e.g., broadcast network packets that were sent from the loopback ports) are modified for network tunneling and sent through appropriate network switch ports for network tunneling. FIG. 17 is an illustrative loopback flow table entry 412 that may be provided by a controller such as controller server 18 to client switches so that network packets received by the client switches from loopback ports are correctly forwarded to other client switches via network tunneling.

As shown in FIG. 17, loopback flow table entry 412 may include a physical input port field and an action field. The physical input port field may identify a loopback port and the action field may include instructions for modifying a network packet for network tunneling and forwarding the network packet to an appropriate tunneling port. For example, controller server 18 may provide a loopback flow table entry 412 to client switch SW6 with loopback port P22 stored in the physical input port field and an action field that directs client switch SW6 to modify network packets that are received at loopback port P22 for network tunneling and to forward the modified network packets from port P22 (e.g., a network switch port associated with a network tunnel through non-client switch network 402). In this scenario, client switch SW6 may use loopback flow table entry 412 to identify network packets that are received at loopback port P22, modify the identified network packets for network tunneling (e.g., by encapsulating the network packets with IP headers and/or using other network protocols), and forward the modified network packets to port P20 (e.g., so that the modified network packets are forwarded through non-client switch network 402 to port P24 of client switch SW8).

Figure 18:
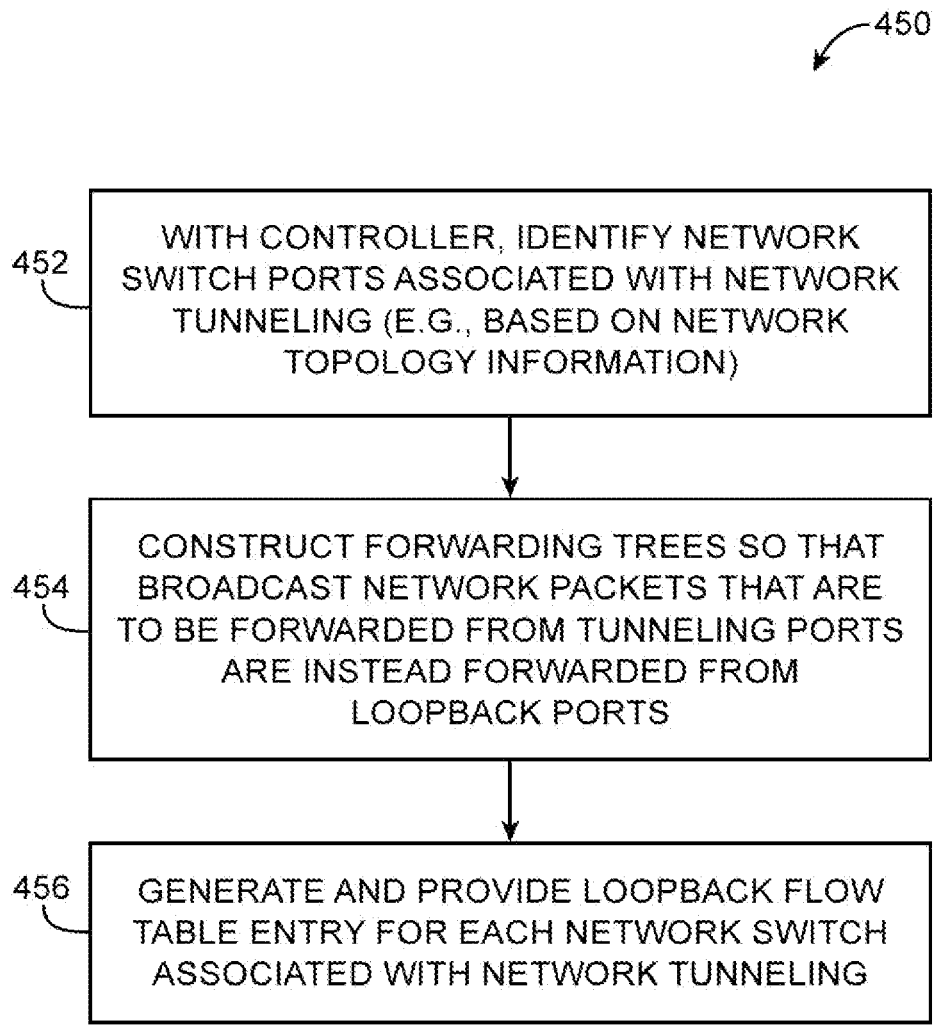
FIG. 18 is a flowchart of illustrative steps that may be performed by a controller to provide network switches with loopback flow table entries that accommodate broadcast domain isolation and network tunneling.

FIG. 18 is a flowchart 450 of illustrative steps that may be performed by a controller such as controller server 18 to generate flow table entries that accommodate broadcast domain isolation along with network tunneling. If desired, the steps of flowchart 450 may be performed as part of step 206 of flowchart 200 of FIG. 11 (e.g., to construct forwarding trees by generating appropriate flow table entries).

In step 452, the controller may identify network switch ports that are associated with network tunneling. The controller may use network topology information to identify network tunnels that have been formed between ports of client switches. For example, the controller may use network topology information to identify network switch ports P20 and P24 that have been used to form a network tunnel between switches SW6 and SW8 through non-client switch network 402.

In step 454, the controller may construct forwarding trees so that broadcast network packets that are to be forwarded from tunneling ports (e.g., ports associated with network tunneling) are instead forwarded from loopback ports, whereas forwarding paths of broadcast network packets that are to be forward from ports coupled to other client switches or end hosts are unaffected. In other words, the controller may construct the forwarding trees to forward broadcast network packets (e.g., broadcast network packets that have been modified by broadcast domain information) to all end hosts of an associated broadcast domain while ensuring that the broadcast network packets are redirected from tunneling ports to loopback ports.

As an example, consider a scenario in which controller server 18 generates a forwarding tree that links end hosts H8, H9, and H10, and includes tunneling ports P20 and P24 of switches SW6 and SW8. In this scenario, the controller may generate and provide a flow table entry to client switch SW6 that forwards broadcast network packets received at network switch SW6 (e.g., from end host H8) to loopback port P22 (e.g., instead of tunneling port P20). The flow table entry may identify additional ports of switch SW6 that the broadcast network packets should be forwarded from (e.g., ports that are associated with the forwarding tree). For example, the flow table entry may also direct client switch SW6 to forward broadcast network packets associated with the forwarding tree to port P23 so that the broadcast network packets are forwarded to end host H10. A flow table entry may be similarly generated for client switch SW8 that forwards broadcast network packets to loopback port P26 instead of tunneling port P24.

In step 456, the controller may generate and provide a loopback flow table entry such as loopback flow table entry 412 for each network switch that is associated with network tunneling. Each loopback flow table entry may be formed based on tunneling information associated with a corresponding network switch. For example, a loopback flow table entry 412 may be formed for switch SW8 of network 400 that directs switch SW8 to modify network packets (e.g., for network tunneling) that are received from physical input port P26 and forward the modified network packets to tunneling port P24.

If desired, the controller may perform the steps of flowchart 450 based on network switch capabilities. For example, the controller may perform the steps of flowchart 450 only for client switches that have been identified by the controller as having limited packet processing capabilities.

The example of FIGS. 16-18 in which a loopback port is used to accommodate broadcast domain isolation and network tunneling is merely illustrative. If desired, a loopback port may be used to accommodate any suitable scenario in which a network switch with limited processing capabilities may be configured to process a network packet multiple times in succession via forwarding of the network packet (or a modified version of the network packet) to the loopback port.

Figure 19:
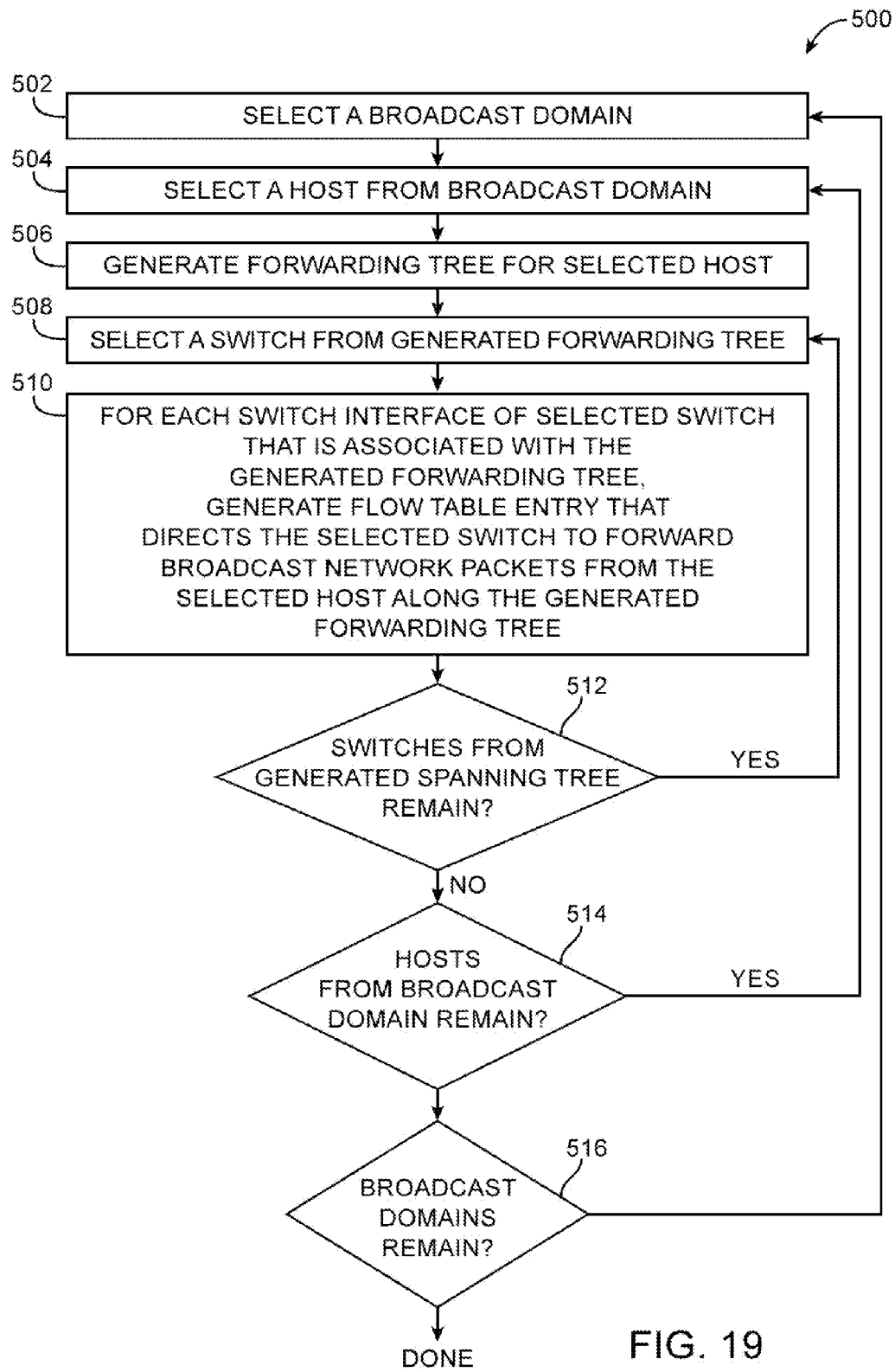
FIG. 19 is a flowchart of illustrative steps that may be performed by a controller to generate flow table entries for broadcast domain isolation.

In an alternate embodiment, a controller may configure client switches for broadcast domain isolation by providing each of the client switches with flow table entries for each end host. FIG. 19 is a flowchart 500 of illustrative steps that may be performed by a controller to provide client switches with flow table entries for each end host.

In step 502, the controller may select a new broadcast domain (e.g., a broadcast domain that has not yet been processed). The broadcast domains may include selected end hosts that have been previously determined by a user such as network administrator.

In step 504, the controller may select a new end host from the selected broadcast domain.

In step 506, the controller may generate a forwarding tree for the selected end host. The forwarding tree may include network switches and network switch interfaces that link the selected end host to each of the other end hosts in the selected broadcast domain.

In step 508, the controller may select a new network switch from the generated forwarding tree. For example, the controller may select a client switch from the generated forwarding tree that has not yet been processed.

In step 510, the controller may generate a flow table entry for each network switch interface of the selected network switch that is associated with the generated forwarding tree. The flow table entries may be generated only for the network switch interfaces that are included in the generated forwarding tree. The generated flow table entry for each network switch interface may direct the selected network switch to forward broadcast network packets received from the selected end host (e.g., the end host selected during step 504) at that network switch interface along the generated forwarding tree (e.g., the forwarding tree generated during step 506).

As an example, the controller may select the broadcast domain of FIG. 9 for network 100 of FIG. 8 during step 502. In this scenario, the controller may select end host H1 from the selected broadcast domain during step 504, generate forwarding tree 112 for end host H1 during step 506, and select switch SW2 during step 508. The controller may then generate a flow table entry for port P4 of switch SW2 that directs switch SW2 to forward broadcast network packets received from end host H1 at port P4 (e.g., packets received at port P4 that have source Ethernet address fields containing the Ethernet address of end host H1) to port P5 and generate a flow table entry for port P5 of switch SW2 that directs switch SW2 to forward broadcast network packets received from end host H1 and port P5 to port P4. Port P3 of switch SW2 may have no corresponding flow table entry, because port P3 is not included in forwarding tree 112.

In step 512, the controller may determine whether switches from the generated forwarding tree remain (e.g., switches that have not yet been selected during step 508 and processed during step 510). If switches from the generated forwarding tree remain, the process may return to step 508 to select a new switch from the remaining switches of the generated forwarding tree. If no switches remain, the operations of step 514 may be performed.

In step 514, the controller may determine whether hosts from the selected broadcast domain have not yet been processed (e.g., hosts that have not yet been selected during step 504). If hosts from the selected broadcast domain remain, the process may return to step 504 to select a new host from the broadcast domain. If no hosts remain, the operations of step 516 may be performed.

In step 516, the controller may determine whether any broadcast domains have not yet been processed. If any broadcast domains have not yet been selected (e.g., during step 502), the process may return to step 502 to select a new broadcast domain. If all broadcast domains have been processed via steps 502-516, the process is complete.

Figure 20:
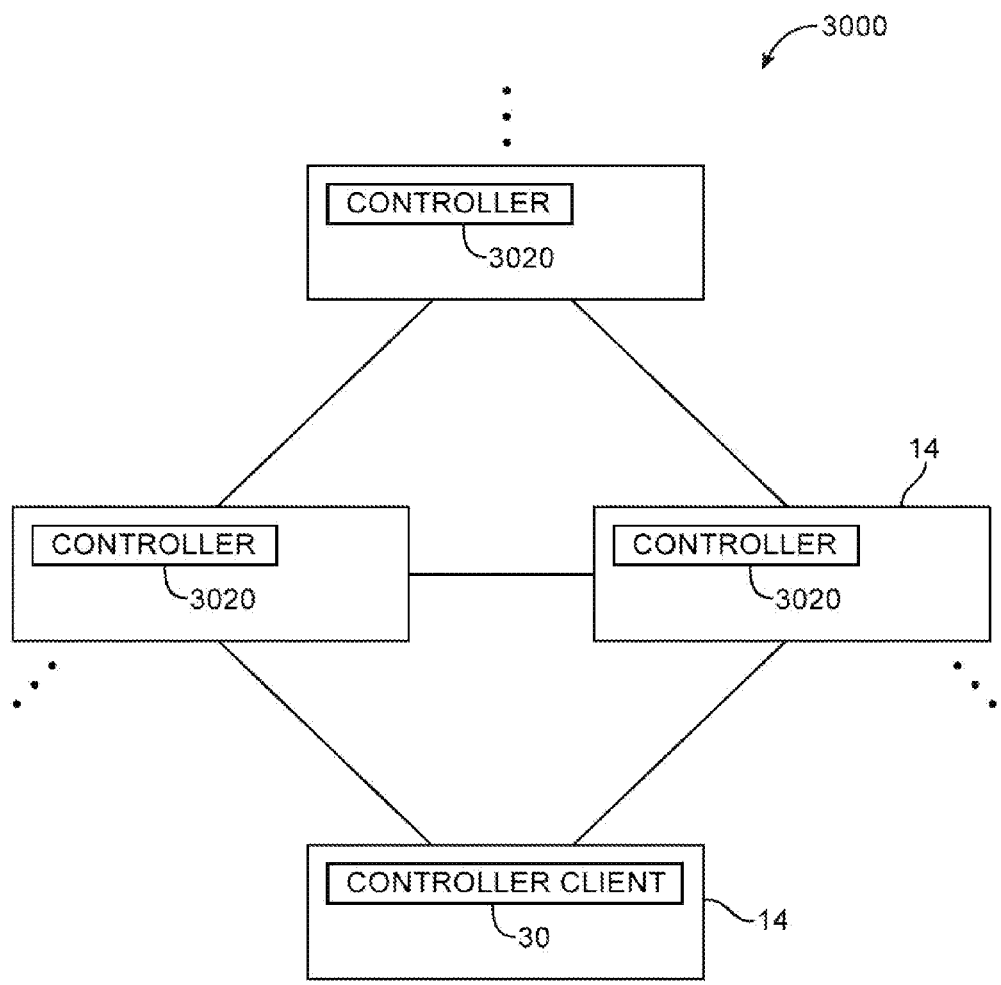
FIG. 20 is a diagram of an illustrative network in which a controller may be distributed throughout switches in the network in accordance with an embodiment of the present invention.

FIG. 20 shows an illustrative example in which controllers 3020 may be distributed on switches 14 throughout network 3000. Controllers 3020 may be distributed on some or all of network switches 14. Controller clients such as controller client 30 may communicate with one or more of controllers 3020 via network communications links (e.g., controllers 3020 may send instructions to controller client 30 via the communications links). Controllers 3020 may communicate with each other to collectively control switches 14 or may individually control switches 14. As an example, controllers 3020 may collectively control network 3000 by communicating with each other. Controllers 3020 may share information relating to network topology, network traffic, end hosts that are coupled to switches 14, etc.

The foregoing is merely illustrative of the principles of this invention and various modifications can be made by those skilled in the art without departing from the scope and spirit of the invention.

What is claimed is:

1. A method of using a controller to control switches in a network having end hosts that are coupled to the switches, wherein the controller maintains information identifying a subset of the end hosts that is associated with a broadcast domain, the method comprising:
    with the controller, configuring switches in the network with an identifier that identifies the broadcast domain associated with the subset of the end hosts;
    with the controller, using the information identifying the subset of the end hosts to determine which of the switches are coupled in a forwarding tree formed from network paths between the end hosts in the subset;
    with the controller, identifying which of the switches from the switches of the forwarding tree are coupled to the end hosts of the subset of the end hosts;
    with the controller, configuring the identified switches so that broadcast network packets that are received by the identified switches from the end hosts of the subset of the end hosts are modified to include the identifier, wherein the network comprises at least one non-client switch that is not controlled by the controller, the at least one non-client switch is interposed between a first switch of the forwarding tree and a second switch of the forwarding tree, and the first switch has a loopback interface operable to return network packets that are forwarded from the loopback interface to the first switch;
    with the controller, configuring the first switch so that broadcast network packets that are to be forwarded to the second switch through the at least one non-client switch are redirected to the loopback interface; and
    with the controller, configuring the first switch to encapsulate network packets that are received from the loopback interface and to forward the encapsulated network packets to the at least one non-client switch, wherein the encapsulated network packets include information that directs the non-client switches to forward the encapsulated network packets from the first switch to the second switch.

2. The method defined in claim 1 wherein determining which of the switches are coupled in the forwarding tree comprises:
    with the controller, using network topology information gathered from the switches to determine which of the switches are coupled in the forwarding tree.

3. The method defined in claim 1 wherein the information identifying the subset of the end hosts comprises a list of end hosts, the method further comprising:
    with the controller, gathering the list of end hosts from a user.

4. The method defined in claim 1 wherein configuring the identified switches so that the broadcast network packets that are received by the identified switches from the end hosts of the subset of the end hosts are modified by the identified switches to include the identifier comprises:
    configuring the identified switches to store the identifier in network address fields of the broadcast network packets.

5. The method defined in claim 4 wherein configuring the identified switches to store the identifier in the network address fields of the broadcast network packets comprises:
    configuring the identified switches to store the identifier in destination Ethernet address fields of the broadcast network packets.

6. The method defined in claim 1 wherein configuring the identified switches so that the broadcast network packets that are received by the identified switches from the end hosts of the subset of the end hosts are modified by the identified switches to include the identifier comprises:
    configuring the identified switches to store the identifier in virtual local area network fields of the broadcast network packets.

7. The method defined in claim 6 wherein the identified switches have switch interfaces that are coupled to the end hosts and to the switches and wherein identifying which of the switches from the switches of the forwarding tree are coupled to the end hosts of the subset of the end hosts comprises:
    identifying which of the switch interfaces are coupled to the end hosts of the subset of the end hosts.

8. The method defined in claim 7 wherein configuring the identified switches so that the broadcast network packets that are received by the identified switches from the end hosts of the subset of the end hosts are modified to include the identifier comprises:
    configuring the identified switches to modify broadcast network packets that are received at the identified switch interfaces to include the identifier.

9. The method defined in claim 7 further comprising:
    configuring the identified switches with the identified switch interfaces so that broadcast network packets that are to be forwarded from the identified switch interfaces directly to the end hosts of the subset of the end hosts are modified to remove the identifier.

10. The method defined in claim 1 wherein configuring the switches in the network with an identifier that identifies the broadcast domain associated with the subset of the end hosts comprises:
    with the controller, providing flow table entries that include the identifier to the switches of the forwarding tree.

11. The method defined in claim 1 wherein determining which of the switches are coupled in a forwarding tree formed from network paths between the end hosts in the subset comprises determining which of the switches are coupled in a spanning tree formed from a minimum number of network paths between the end hosts in the subset.

12. The method defined in claim 1 wherein configuring the switches in the network with the identifier that identifies the broadcast domain associated with the subset of the end hosts comprises:
    with the controller, providing packet forwarding information to switches associated with the subset so that the switches associated with the subset are configured to forward broadcast network packets from end hosts in the subset exclusively to the end hosts associated with the subset.

13. The method defined in claim 12 wherein providing the packet forwarding information to the switches comprises providing flow table entries to the switches that configure the switches to forward the broadcast network packets from end hosts in the subset exclusively to the end hosts associated with the subset.

14. The method defined in claim 12 wherein providing the packet forwarding information to the switches associated with the subset comprises:
   for each end host of the subset, providing packet forwarding information using the controller to each of the switches associated with the subset that identifies how to forward broadcast network packets received at that switch to that end host.

15. The method defined in claim 12 wherein providing the packet forwarding information to the switches associated with the subset comprises:
   with the controller, configuring the switches associated with the subset with an identifier that identifies the broadcast domain associated with the subset.

16. The method defined in claim 1 wherein the subset of end hosts comprises a first subset of end hosts, the method further comprising:
   with the controller, identifying a second subset of end hosts that is different from the first subset of end hosts;
   with the controller, configuring the switches in the network to forward broadcast network packets from the first subset of end hosts in the subset exclusively to the first subset of end hosts; and
   with the controller, configuring the switches in the network to forward broadcast network packets from the second subset of end hosts in the subset exclusively to the second subset of end hosts.

* * * * *